US012645867B2

(12) United States Patent
Vinalon

(10) Patent No.: US 12,645,867 B2
(45) Date of Patent: Jun. 2, 2026

(54) IMAGE PROCESSING APPARATUS AND IMAGE FORMING APPARATUS

(71) Applicant: KYOCERA Document Solutions Inc., Osaka (JP)

(72) Inventor: Jezza Vinalon, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 520 days.

(21) Appl. No.: 18/033,778

(22) PCT Filed: Oct. 5, 2021

(86) PCT No.: PCT/JP2021/036836
§ 371 (c)(1),
(2) Date: Apr. 25, 2023

(87) PCT Pub. No.: WO2022/097408
PCT Pub. Date: May 12, 2022

(65) Prior Publication Data
US 2023/0394228 A1     Dec. 7, 2023

(30) Foreign Application Priority Data

Nov. 4, 2020     (JP) ................................. 2020-184535

(51) Int. Cl.
*G06F 40/169*     (2020.01)
*G06F 3/04883*     (2022.01)
*G06V 30/414*     (2022.01)

(52) U.S. Cl.
CPC ........ *G06F 40/169* (2020.01); *G06F 3/04883* (2013.01); *G06V 30/414* (2022.01)

(58) Field of Classification Search
CPC .. G06F 40/169; G06F 3/04883; G06V 30/414
See application file for complete search history.

(56) References Cited

U.S. PATENT DOCUMENTS

| | | | | | |
|---|---|---|---|---|---|
| 8,260,064 | B2 * | 9/2012 | Konno | .................... | G06F 40/58 |
| | | | | | 382/229 |
| 8,483,483 | B2 * | 7/2013 | Ohnishi | ............. | H04N 1/00374 |
| | | | | | 382/179 |
| 8,548,267 | B1 * | 10/2013 | Yacoub | .................... | H04N 1/60 |
| | | | | | 382/176 |
| 8,787,670 | B2 * | 7/2014 | Cowley | .................. | G06F 18/00 |
| | | | | | 382/176 |

(Continued)

FOREIGN PATENT DOCUMENTS

JP          2014030080 A      2/2014

*Primary Examiner* — Mohammed H Zuberi
(74) *Attorney, Agent, or Firm* — IP Business Solutions, LLC

(57) ABSTRACT

An image forming apparatus includes a storage device for storing a source image, a character region identifier that identifies a character region in the source image, an image acquirer that acquires an image of the character region from the source image, an annotation line identifier that detects an annotation lines in the character region, and identifies a position of the annotation line, and a generator that generates, from the source image, a modified image not containing an image located outside the character region in the source image, and in which the annotation lines have been deleted from the image of the character region.

9 Claims, 20 Drawing Sheets

(56) References Cited

U.S. PATENT DOCUMENTS

| | | | |
|---|---|---|---|
| 9,098,946 B2 * | 8/2015 | Sato | H04N 1/626 |
| 9,451,118 B2 * | 9/2016 | Okumura | G06V 30/146 |
| 10,936,893 B2 * | 3/2021 | Hayashi | H04N 1/40062 |
| 11,341,733 B2 * | 5/2022 | Ikeda | G06V 30/40 |
| 11,823,358 B2 * | 11/2023 | He | G06V 30/155 |
| 2008/0144131 A1 | 6/2008 | Jung et al. | |
| 2009/0103808 A1 * | 4/2009 | Dey | G06V 30/1478 |
| | | | 382/269 |
| 2009/0252415 A1 * | 10/2009 | Worm | G06V 30/424 |
| | | | 382/176 |
| 2009/0300475 A1 * | 12/2009 | Fink | G06F 3/0482 |
| | | | 726/4 |
| 2016/0098594 A1 * | 4/2016 | Sugiura | G06V 30/36 |
| | | | 382/189 |
| 2017/0344323 A1 * | 11/2017 | Harada | G06F 3/1285 |
| 2018/0088794 A1 * | 3/2018 | Graham | G06F 3/04883 |
| 2019/0065911 A1 * | 2/2019 | Lee | G06V 10/82 |
| 2019/0281170 A1 * | 9/2019 | Yokogawa | H04N 23/811 |
| 2020/0176098 A1 * | 6/2020 | Lucas | G06F 40/30 |
| 2021/0209354 A1 * | 7/2021 | Abekawa | G06V 30/416 |

* cited by examiner

REPORT SUBMISSION DEADLINE:
UNTIL MARCH 4TH

WHAT KIND OF POWER IS
MAGICAL HEALING POWER?    M2

Mark's Story

L1

A long time ago, a king and queen had
A baby son named Mark with golden    L2
eyes contained magical healing power.
Mark was loved by them and grew up
quickly.

A mysterious man heard the baby's rumors
and was looking for an opportunity to take
him away.

WHO ?

LOOKING FOR MONEY?
RESENTMENT?    M4

M3             L3                          CID

SCAN

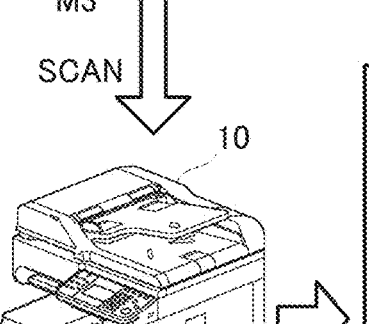

10

Mark's Story

A long time ago, a king and
queen had a baby son named
Mark with golden eyes contained
magical healing power.

Mark was loved by them and
grew up quickly.

A mysterious man heard the
baby's rumors and was looking
for an opportunity to take him
away.

PRINT OR DATA OUTPUT

Fig.8
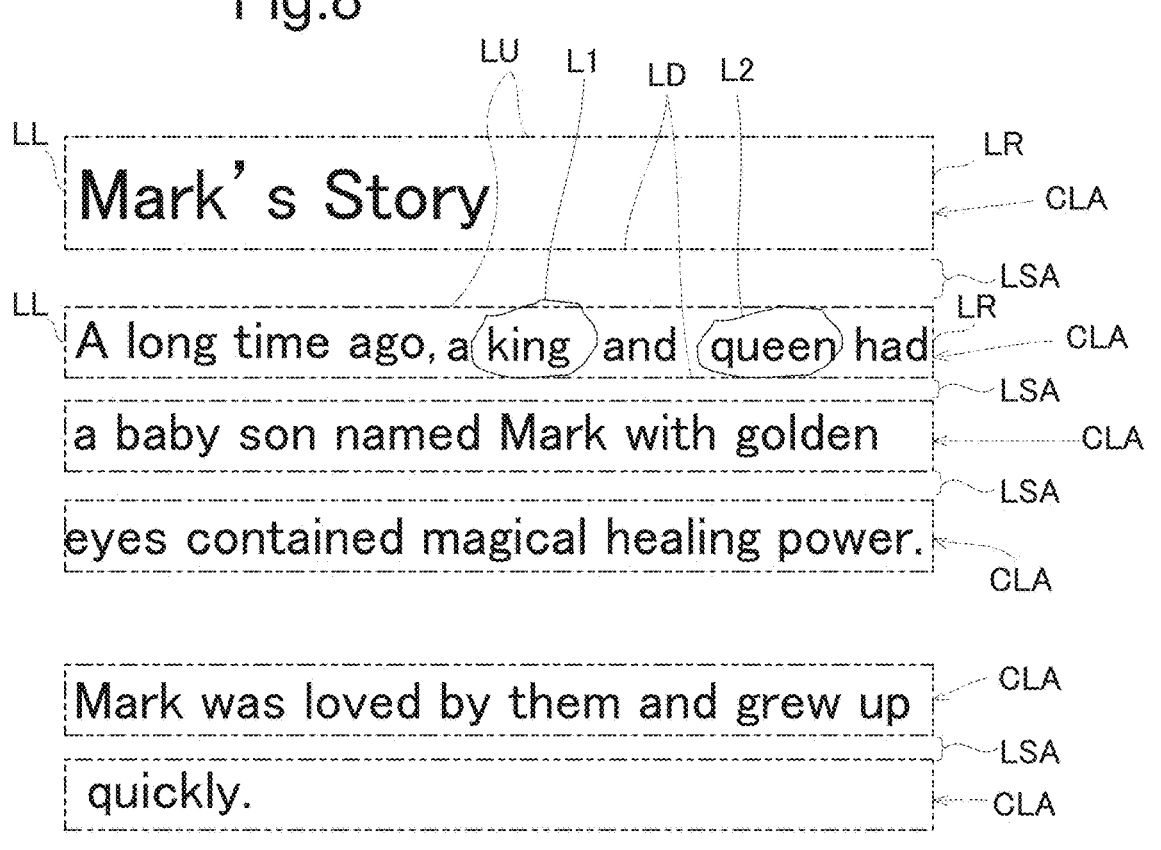
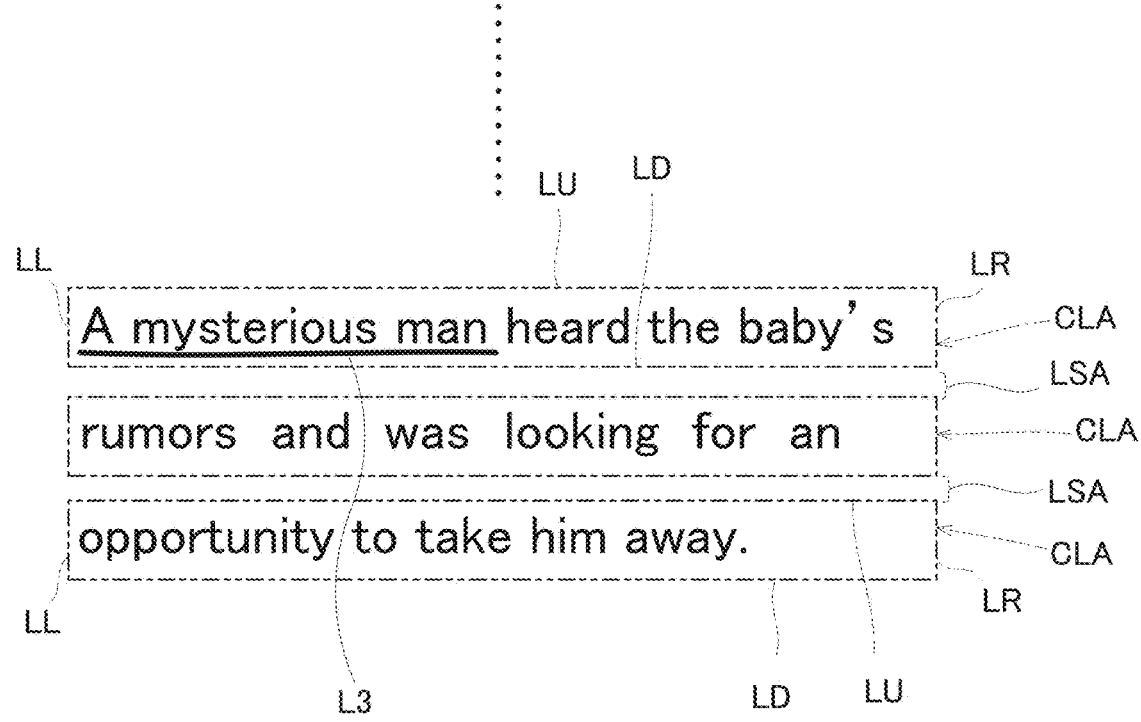

Figure 11B:
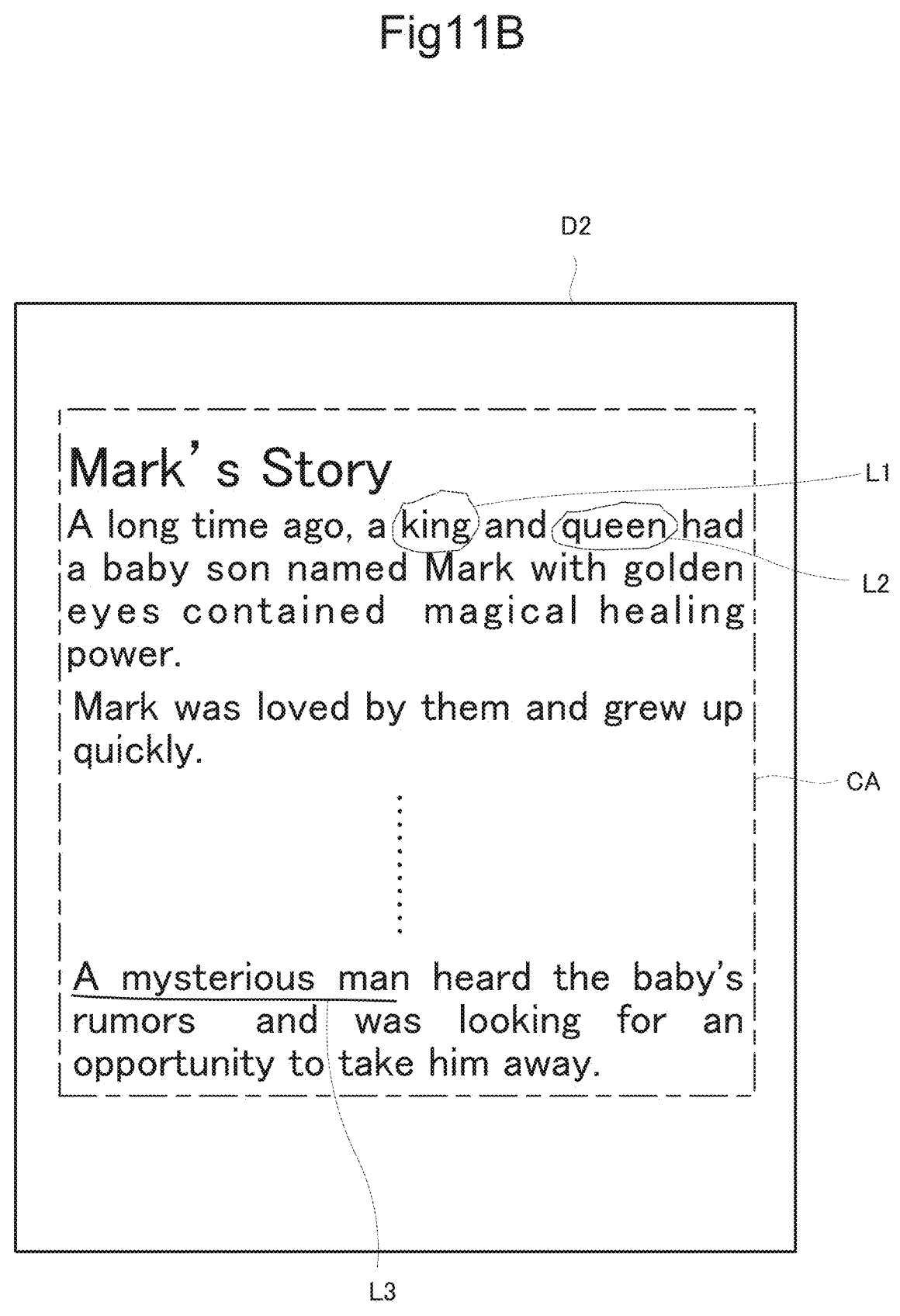

Mark's Story

A long time ago, a king and queen had a baby son named Mark with golden eyes contained magical healing power.

Mark was loved by them and grew up quickly.

A mysterious man heard the baby's rumors and was looking for an opportunity to take him away.

L1

L2

CA

L3

Fig13
TARGET
CHARACTER
(22×22GRID)
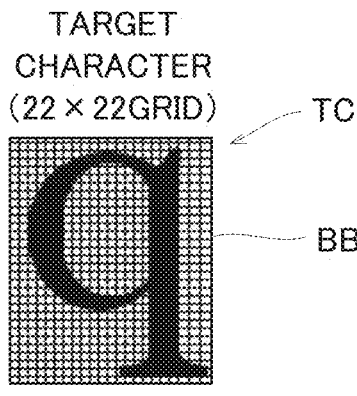
TC
BB
142 PIXELS
　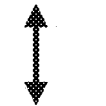　
CHARACTER IN
FONT OF ARIAL
(22×22GRID)
CHARACTER IN
FONT OF COURIER
NEW(22×22GRID)
CHARACTER IN FONT
OF TIMES NEW ROMAN
(22×22GRID)
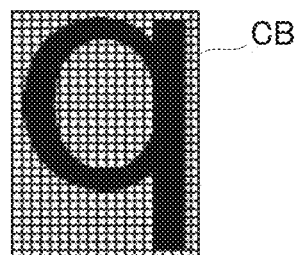
CB
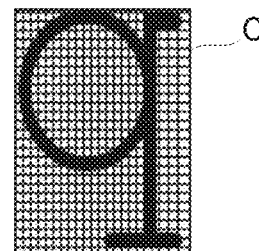
CB
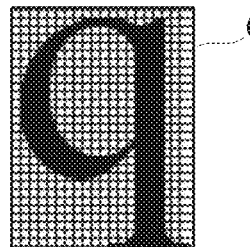
CB
156 PIXELS
DEGREE OF
ACCORDANCE
=91.03%
118 PIXELS
DEGREE OF
ACCORDANCE
=83.10%
135 PIXELS
DEGREE OF
ACCORDANCE
=95.07%
IDENTIFY
TIMES NEW ROMAN OF
HIGHEST DEGREE OF
ACCORDANCE,
AS MOST SIMILAR FONT

Fig14
TARGET
CHARACTER
(22 × 22 GRID) — TC
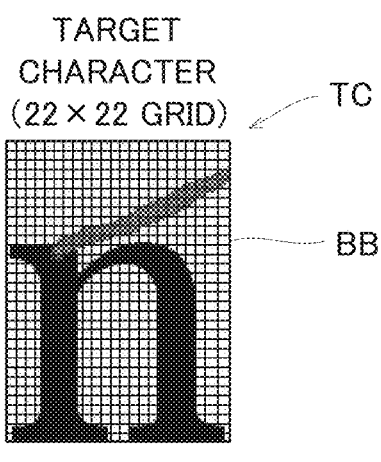
— BB
151 PIXELS
IN FONT OF TIMES NEW ROMAN
CHARACTER ""
(22 × 22 GRID)
CHARACTER ""
(22 × 22 GRID)
CHARACTER ""
(22 × 22 GRID)
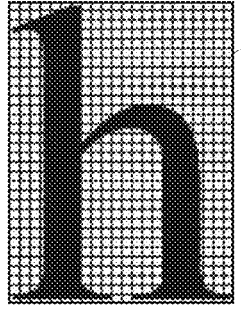 — CB
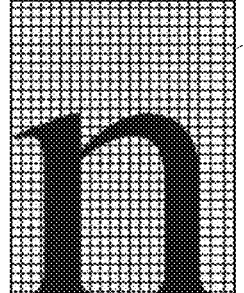 — CB
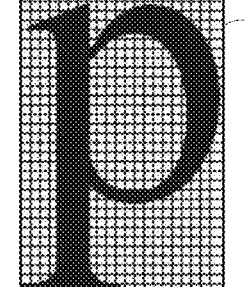 — CB
170 PIXELS
DEGREE OF
ACCORDANCE
＝88.82%
138 PIXELS
DEGREE OF
ACCORDANCE
＝91.39%
174 PIXELS
DEGREE OF
ACCORDANCE
＝86.78%
IDENTIFY "" OF HIGHEST
DEGREE OF ACCORDANCE, AS
MOST SIMILAR CHARACTER

Fig15B

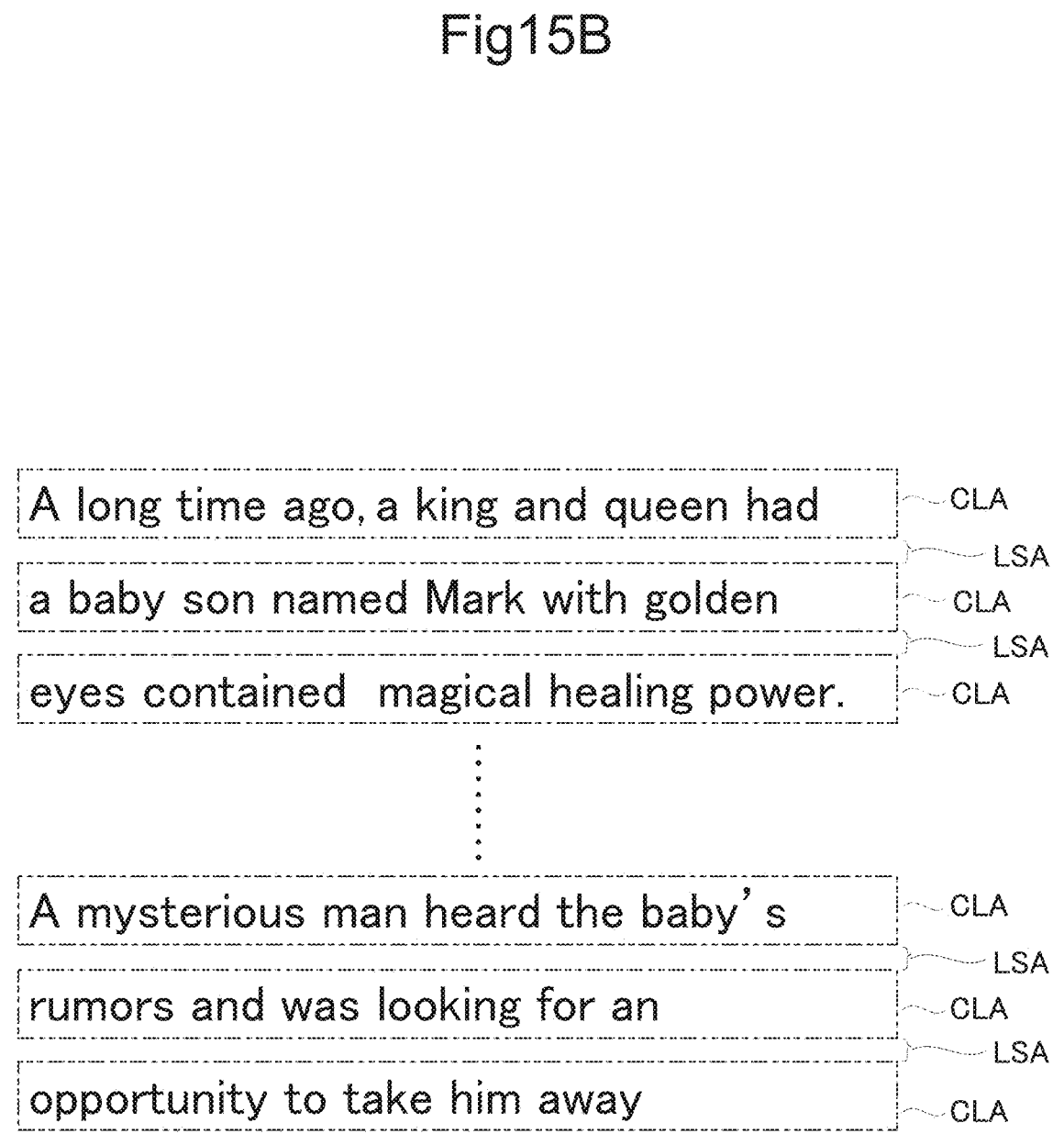

A long time ago, a king and queen had    ⌐CLA

⌐LSA a baby son named Mark with golden    ⌐CLA

⌐LSA eyes contained  magical healing power.    ⌐CLA

A mysterious man heard the baby's    ⌐CLA

⌐LSA rumors and was looking for an    ⌐CLA

⌐LSA opportunity to take him away    ⌐CLA

Fig16

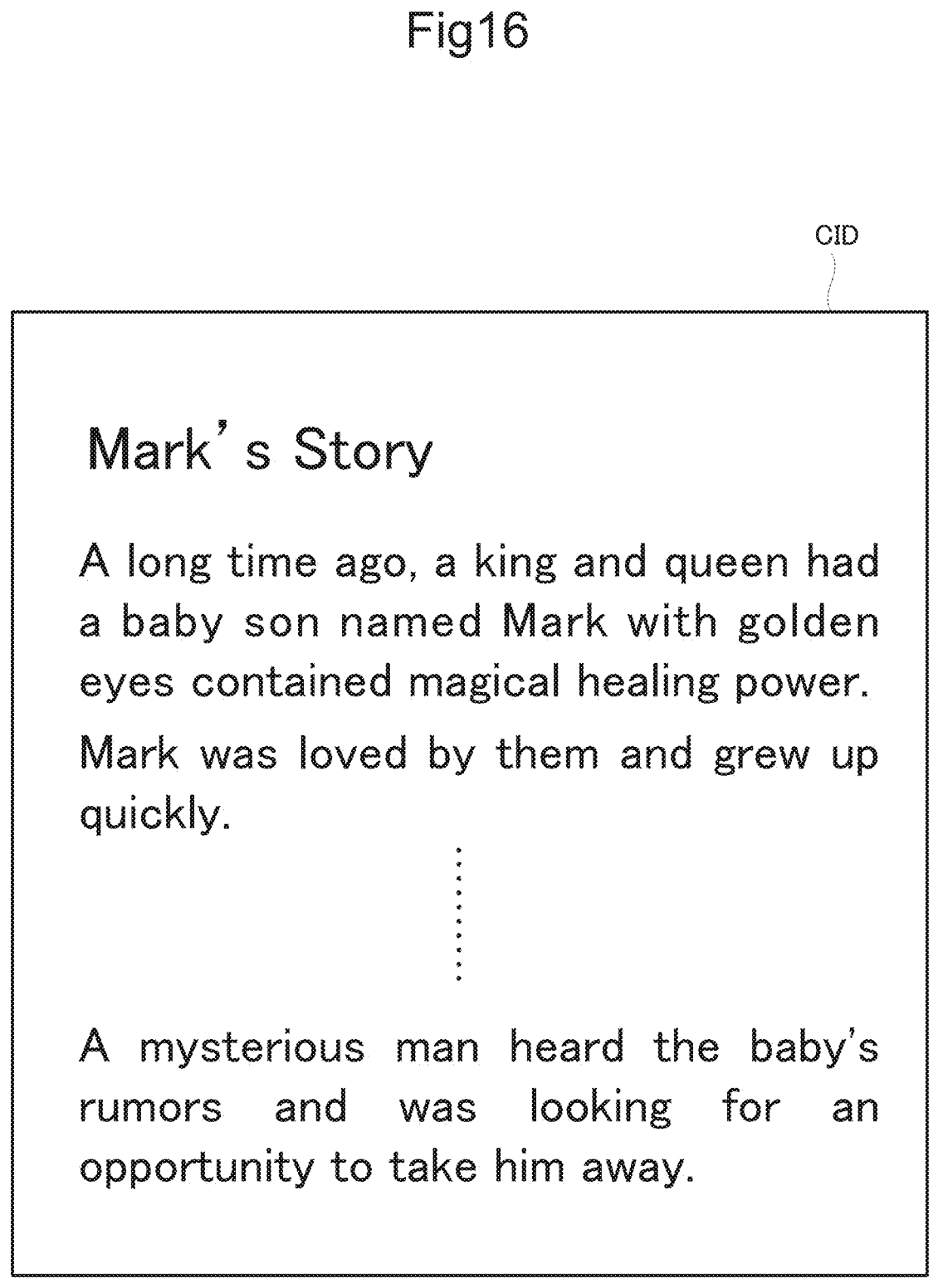

CID

Mark's Story

A long time ago, a king and queen had a baby son named Mark with golden eyes contained magical healing power.

Mark was loved by them and grew up quickly.

⋮

A mysterious man heard the baby's rumors and was looking for an opportunity to take him away.

Mark's Story

A long time ago, a king and queen had a baby son named Mark with golden eyes contained magical healing power.

Mark was loved by them and grew up quickly.

A mysterious man heard the baby's rumors and was looking for an opportunity to take him away.

IMAGE PROCESSING APPARATUS AND IMAGE FORMING APPARATUS

TECHNICAL FIELD

The present invention relates to an image processing apparatus and an image forming apparatus, and in particular to a technique to acquire, from a source image containing hand-written memoranda, an image from which the hand-written memoranda have been deleted.

BACKGROUND ART

Patent Literature (PTL) 1 discloses an image forming apparatus that, with respect to each of a plurality of character images contained in a source image, sequentially decides one by one whether the font of the character image accords with one of a predetermined plurality of fonts; decides that an according character image is not a hand-written character and that a discording character image is a hand-written character; and generates an image in which the character image decided not to be the hand-written character are left, and the characters decided to be the hand-written character have been deleted.

CITATION LIST

Patent Literature

PTL 1: Japanese Unexamined Patent Application Publication No. 2014-30080

SUMMARY OF INVENTION

Technical Problem

The image forming apparatus according to PTL 1 decides whether the character image is representing a hand-written character, individually with respect to each of the plurality of character images contained in the source image. For example, when many hand-written characters are marked in the blank along the periphery of the source document, it takes time for the image forming apparatus to identify the hand-written characters, and therefore the image from which the hand-written memoranda have been deleted is unable to be quickly acquired. In addition, the image forming apparatus may fail to completely delete the hand-written memoranda from the source image. Further, when hand-written annotation lines such as an underline and an enclosure are marked, with respect to a selected word or phrase in a character region in the source image, such annotation lines are unable to be deleted.

The present invention has been accomplished in view of the foregoing situation, and provides a technique to quickly acquire, from a source image containing hand-written memoranda such as a hand-written character and a hand-written annotation line, an image from which the hand-written memoranda have been deleted, with improved deletion accuracy of the hand-written memoranda.

Solution to Problem

In an aspect, the present invention provides an image processing apparatus including a storage device for storing a source image, a character region identifier that identifies a character region in the source image, an image acquirer that acquires an image of the character region from the source image, an annotation line identifier that detects an annotation line in the character region, and identifies a position of the annotation line, and a generator that generates, from the source image, a modified image not containing an image located outside the character region in the source image, and in which the annotation line has been deleted from the image of the character region.

In another aspect, the present invention provides an image forming apparatus including the foregoing image processing apparatus, an image reading device that reads a source document and generates the source image, a controller that stores the source image generated by the image reading device in the storage device, and an image forming device that forms the modified image on a recording medium.

Advantageous Effects of Invention

The mentioned configuration according to the present invention enables an image from which hand-written memoranda have been deleted to be quickly acquired from a source image containing the hand-written memoranda, and also improves deletion accuracy of the hand-written memoranda.

BRIEF DESCRIPTION OF DRAWINGS

FIG. 3 is a schematic drawing conceptually showing a hand-written memoranda deletion process.

FIG. 8 is a schematic drawing showing an example of an identification method of a line region and an interlinear region.

FIG. 11B is a schematic drawing showing an example of a periphery-cleared image.

FIG. 13 is a schematic drawing showing an example of the font identification process.

FIG. 14 is a schematic drawing showing an example of a character identification process.

FIG. 15B is a schematic drawing showing an example of the character region from which an image in the interlinear region has been deleted.

FIG. 16 is a schematic drawing showing an example of image data representing the modified image.

DESCRIPTION OF EMBODIMENT

Figure 1:
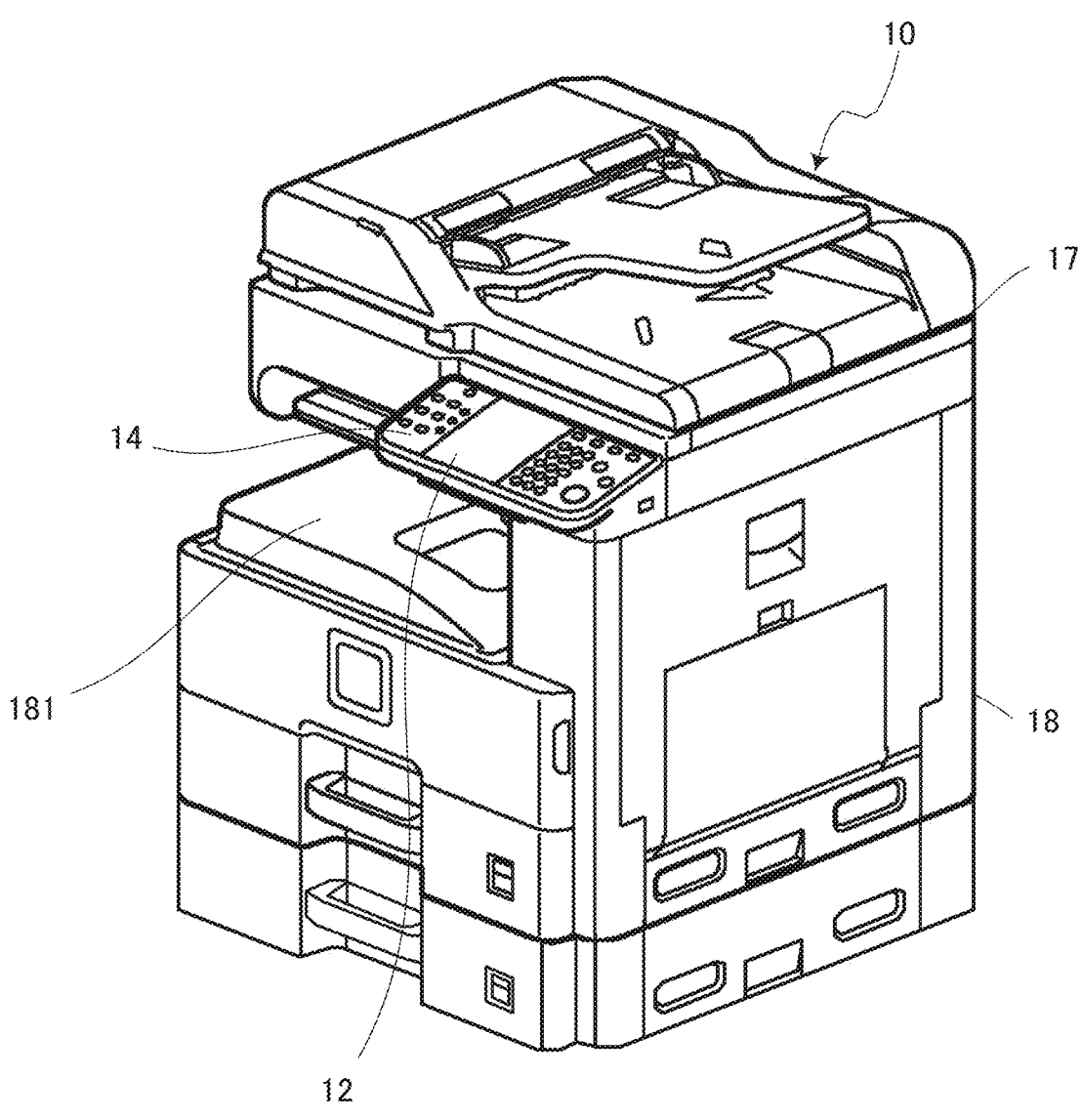
FIG. 1 is a perspective view showing an image forming apparatus according to an embodiment of the present invention.
Figure 2:
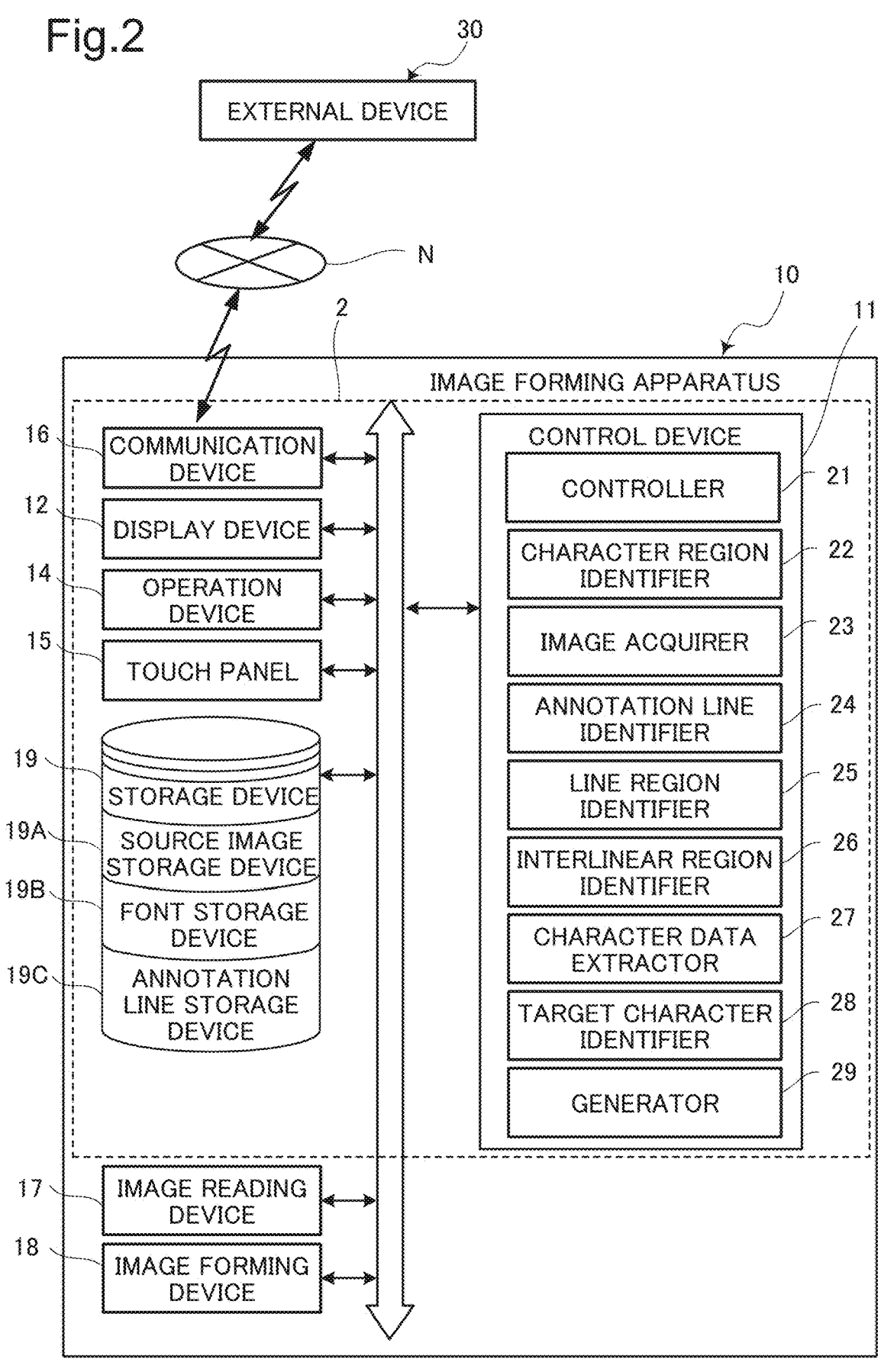
FIG. 2 is a block diagram showing a configuration of the image forming apparatus.

Hereafter, an embodiment of an image processing apparatus and an image forming apparatus according to the present invention will be described, with reference to the drawings. FIG. 1 is a perspective view showing the image forming apparatus 10 according to the embodiment of the present invention. FIG. 2 is a block diagram showing a configuration of the image forming apparatus 10.

The image forming apparatus 10 includes a control device 11, a display device 12, an operation device 14, a touch panel 15, a communication device 16, an image reading device 17, an image forming device 18, and a storage device 19. These elements are configured to transmit and receive data or signals to and from each other, via a bus.

The image reading device 17 is a reading mechanism including a charge coupled device (CCD) acting as a scanner that optically reads, for example, a source document G1 (see FIG. 3) transported by an automatic document feeder, or a source document G1 placed on a flat bed. The image reading device 17 generates a source image D1 (see FIG. 3) representing the source document G1. The source image D1 has a rectangular outer shape, because of the structure of the reading mechanism.

The image forming device 18 is configured to electrically charge the surface of a photoconductor drum uniformly, form an electrostatic latent image on the surface of the photoconductor drum by exposure, develop the electrostatic latent image on the surface of the photoconductor drum into a toner image, and transfer and fix the toner image on the surface of the photoconductor drum onto a recording sheet. For example, the image forming device 18 prints the source image D1, acquired through the reading operation of the source document G1 by the image reading device 17, on the recording sheet. The recording sheet on which the source image D1 has been printed is delivered to an output tray 181.

It is to be noted the components of the image forming apparatus 10 other than the image reading device 17 and the image forming device 18 constitute the image processing apparatus 2.

The display device 12 is, for example, constituted of a liquid crystal display (LCD) or an organic light-emitting diode (OLED) display.

The operation device 14 receives inputs of instructions from a user. The operation device 14 includes hard keys, such as menu keys for invoking a menu, arrow keys for moving a focus in a graphical user interface (GUI) constituting the menu, an enter key for confirming the menu through the GUI, and a start key.

The touch panel 15 is based on a resistive film or electrostatic capacitance. The touch panel 15 is located over the screen of the display device 12. The touch panel 15 detects a touch of the user's finger made on the screen of the display device 12, along with the touched position. Upon detecting the touch of the finger, the touch panel 15 outputs a detection signal indicating the coordinate of the touched position, to a controller 21 of the control device 11. Therefore, the touch panel 15 serves as an operation device for the user to input instructions through the screen of the display device 12.

The communication device 16 is a communication interface including a communication module. The communication device 16 transmits and receives data, to and from an external device 30 (e.g., personal computer, server, or mobile information terminal), through a network N such as a local area network (LAN) or a telephone network.

The storage device 19 is a large-capacity memory unit such as a hard disk drive (HDD). The storage device 19 includes a source image storage device 19A, for storing the source image D1 of the source document G1 (i.e., image data) acquired through the reading operation by the image reading device 17.

FIG. 3 is a schematically illustrates a hand-written memoranda deletion process, for generating an image in which hand-written memoranda have been deleted from the source image D1. The image forming apparatus 10 is configured to read the source document G1 containing, as shown in FIG. 3, hand-written memoranda such as character strings M1 to M4 composed of hand-written characters, and hand-written annotation lines L1 to L3, and execute the hand-written memoranda deletion process for generating a modified image CID in which the hand-written memoranda have been deleted from the source image D1. Further detail of the process will be subsequently described.

The storage device 19 also includes a font storage device 19B containing in advance a plurality of font types. The font storage device 19B contains a plurality of types of font data, for example "Arial", "Courier New", "Times New Roman", and so forth.

Further, the storage device 19 includes an annotation line storage device 19C, containing in advance a plurality of reference annotation lines. The annotation line storage device 19C contains data indicating a plurality of reference annotation lines of different shapes, for example, elliptical, rectangular (box), and underline.

The control device 11 includes a processor, a random-access memory (RAM), and a read-only memory (ROM). The processor is, for example, a central processing device (CPU), a micro processing device (MPU), or an application specific integrated circuit (ASIC). The control device 11 acts as the controller 21, a character region identifier 22, an image acquirer 23, an annotation line identifier 24, a line region identifier 25, an interlinear region identifier 26, a character data extractor 27, a target character identifier 28, and a generator 29, when the processor executes a control program stored in the storage device 19. Here, the controller 21, the character region identifier 22, the image acquirer 23, the annotation line identifier 24, the line region identifier 25, the interlinear region identifier 26, the character data extractor 27, the target character identifier 28, and the generator 29 may each be constituted in the form of a logic circuit, instead of being realized by the operation according to the control program.

Figure 4:
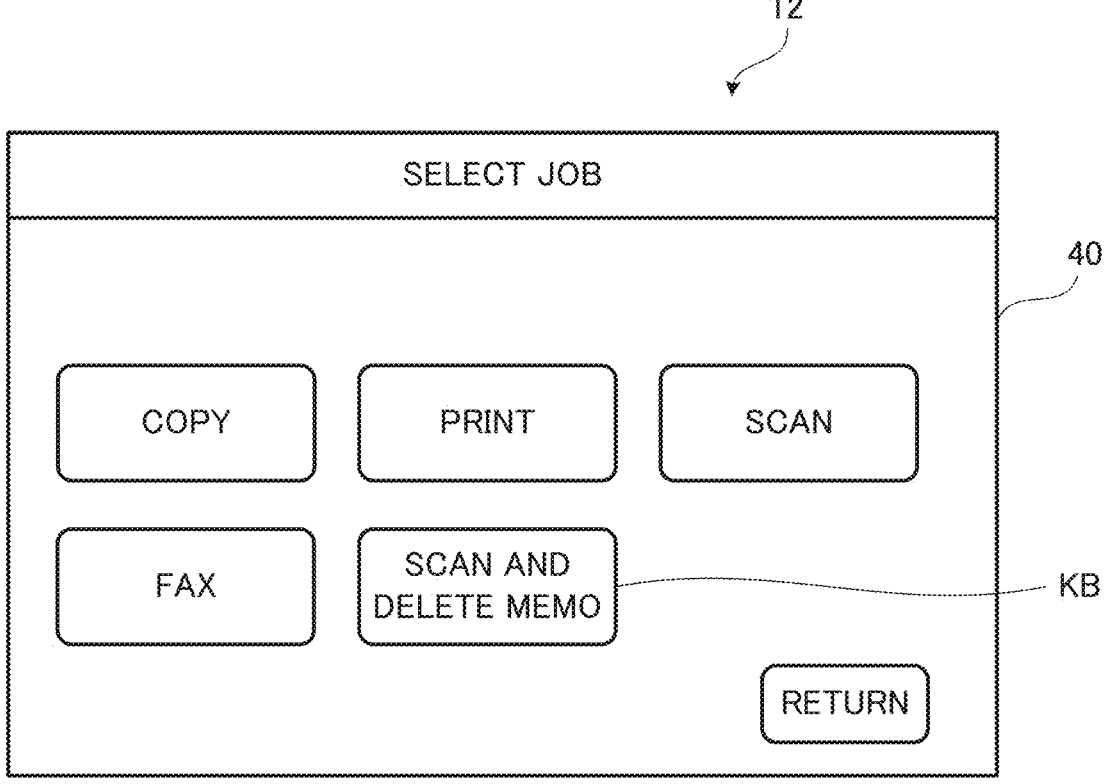
FIG. 4 is a schematic drawing showing an example of a screen of a display device.

The controller 21 controls the overall operation of the image forming apparatus FIG. 4 illustrates an example of the screen of the display device 12. For example, the controller 21 causes the display device 12 to display an operation screen 40 shown in FIG. 4. The controller 21 executes, according to the touch operation performed by the user on the operation screen 40, the control related to various operations, such as copying, printing, scanning, facsimile transmission, and hand-written memoranda deletion.

The character region identifier 22 identifies a character region CA (see FIG. 6B to be subsequently referred to) in the source image D1 (i.e., image data acquired by scanning the source document G1) stored in the source image storage device 19A. The character region CA refers to the region where characters other than hand-written characters are described. For example, the character region identifier 22 performs layout analysis, included in a known optical character recognition (OCR) process, with respect to the source image D1, thereby identifying the character region CA in the source image D1. The character region identifier 22 stores the layout result indicating the character region CA identified by the source image D1, in the storage device 19.

The image acquirer 23 acquires the image of the character region CA identified by the character region identifier 22 in the source image D1. For example, the image acquirer 23 crops the image of the character region CA from the source image D1, by a known image cropping (trimming) operation.

The annotation line identifier 24 detects the hand-written annotation lines L1 to L3 in the character region CA, and identifies the respective positions of the annotation lines L1 to L3. As shown in FIG. 3, the annotation line L1 and the annotation line L2 are hand-written annular enclosures. The annotation line L3 is a hand-written underline.

To be more specific, the annotation line identifier 24 detects the lines, the degree of similarity of which to one of a plurality of reference annotation lines stored in the annotation line storage device 19C is equal to or higher than a predetermined degree, in the character region CA, as the annotation lines L1 to L3, and identifies the respective positions of the annotation lines L1 to L3 thus detected.

The line region identifier 25 identifies each of a plurality of line regions CLA (see FIG. 8) in the character region CA. For example, the line region identifier 25 identifies, with respect to each of the character lines in the character region CA, a line including the upper-end position of the tallest character among the plurality of characters contained in the character line, as an upper-end line LU, and a line including the lower-end position of the character located at the lowest position, as a lower-end line LD. The line region identifier 25 also identifies the line including the left-end position of the character region CA shown in FIG. 6B, as a left-end line LL shown in FIG. 9A, and the line including the right-end position of the character region CA as a right-end line LR shown in FIG. 9A. Then the line region identifier 25 identifies the region surrounded by the upper-end line LU, the lower-end line LD, the left-end line LL, and the right-end line LR, as the line region CLA.

The interlinear region identifier 26 identifies an interlinear region LSA (see FIG. 8) located between the line regions CLA adjacent to each other.

The character data extractor 27 performs the OCR process with respect to the character region CA identified by the character region identifier 22, to thereby extract a plurality of characters contained in each of the line regions CLA in the character region CA (character data), and a plurality of pieces of position information indicating the respective positions of the plurality of characters, in association with each other.

Figure 6A:
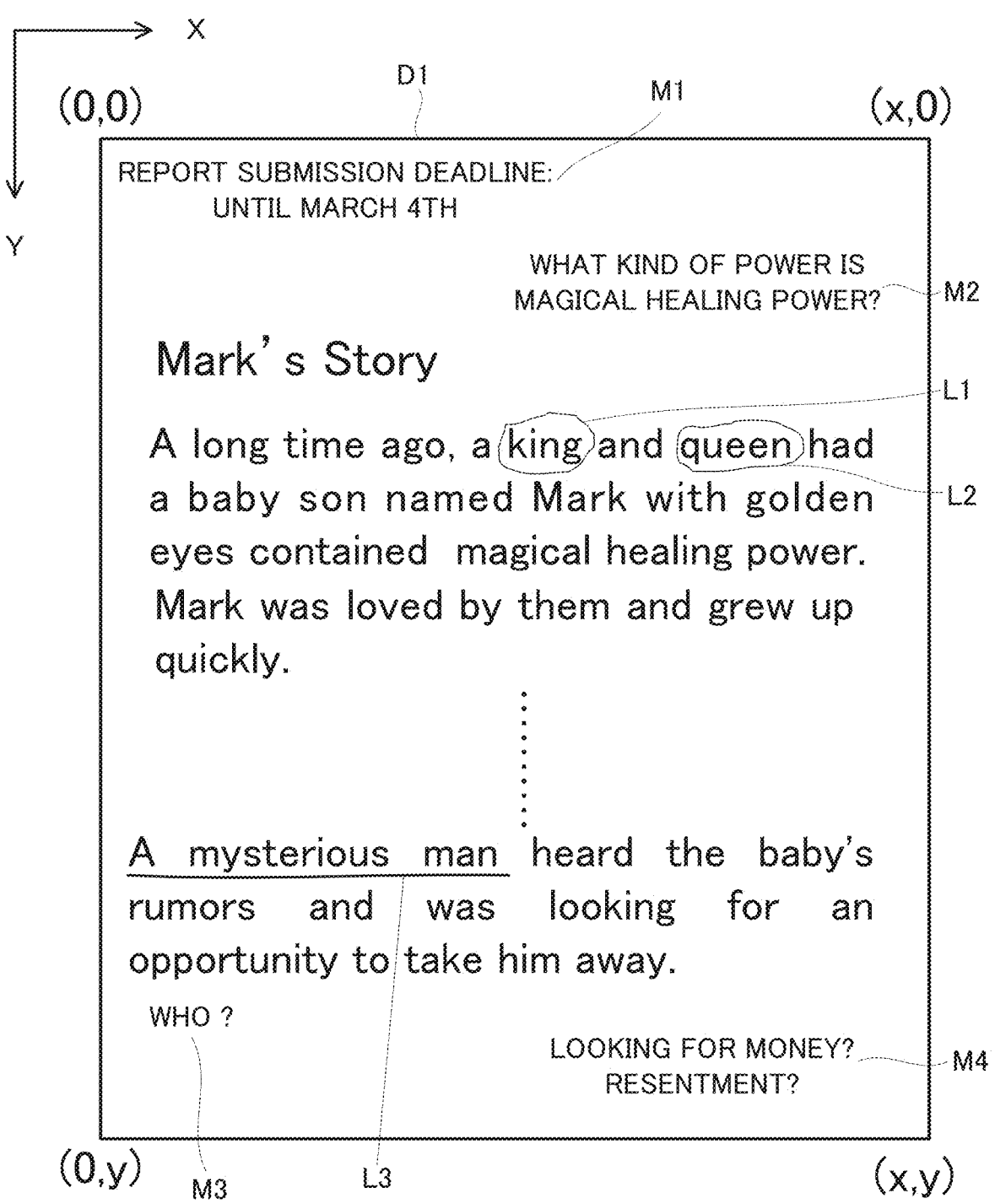
FIG. 6A is a schematic drawing showing an example of a source image subjected to layout analysis.

The position information of the character extracted by the character data extractor 27 indicates the position of that character in the source image D1. The position information indicates, for example, the coordinate of the character data in the source image D1. As shown in FIG. 6A, the character data extractor 27 defines, in the source image D1, the coordinate of the upper left corner as (0, 0), the coordinate of the upper right corner as (x, 0), the coordinate of the lower left corner as (0, y), and the coordinate of the lower right corner as (x, y). The character data extractor 27 extracts, from the source image D1, the character, and the position information indicating the coordinates of the four corners of the rectangular region including the character (or position information indicating the coordinates of only two corners diagonally opposite to each other), in association with each other. When the source image D1 contains a plurality of characters, the character data extractor 27 extracts the plurality of characters, and the position information of the respective characters, in association with each other. The character data extractor 27 stores the character and the position information thereof in the character region CA of the source image D1, in the source image storage device 19A in association with each other.

The target character identifier 28 identifies the character corresponding to the position information indicating the position according with the position of the annotation line identified by the annotation line identifier 24, out of the plurality of pieces of position information extracted by the character data extractor 27, as a target character TC with which the annotation line is overlapping, out of the characters in the line region CLA.

To be more specific, the target character identifier 28 identifies the character corresponding to the position information indicating the position according with the position of the annotation line L1, as the target character TC with which the annotation line L1 is overlapping. The target character identifier 28 also identifies the character corresponding to the position information indicating the position according with the position of the annotation line L2, as the target character TC with which the annotation line L2 is overlapping.

Here, regarding the annotation line L3, since there is no target character TC with which the annotation line L3 is overlapping, the target character identifier 28 does not identify the target character TC. In other words, the position information indicating the position according with the position of the annotation line L3 is unavailable, and therefore the target character identifier 28 decides that the target character TC with which the annotation line L3 is overlapping is non-existent, and keeps from identifying the target character TC.

The generator 29 generates, from the source image D1, a modified image CID not containing the image located outside the character region CA in the source image D1, and in which the annotation lines L1 to L3 have been deleted from the image of the character region CA.

For example, the generator 29 substitutes the target character TC in the line region CLA with a character showing highest degree of accordance with the target character TC (e.g., synthesizes, on the target character TC, a character image of the font most similar to that of the target character TC). The generator 29 also deletes the image in the interlinear region LSA (e.g., synthesizes, on the interlinear region LSA in the source image D1, a solid image of the ground color of the interlinear region LSA (background image)). Thus, the generator 29 deletes the annotation lines L1 to L3 from the image of the character region CA.

Here, the generator 29 identifies the ground color of the interlinear region LSA, for example by detecting the color of the pixel of a predetermined position in the interlinear region LSA. Alternatively, the generator 29 may adopt the average color of all or a part of the pixels in the interlinear region LSA, as the ground color of the interlinear region LSA.

The generator 29 deletes the image in the peripheral region located outside the character region CA, from the source image D1 stored in the source image storage device 19A, thereby generating a periphery-cleared image D2 (see FIG. 11B). For example, the generator 29 synthesizes, on the peripheral region located outside the character region CA in the source image D1, a solid image of the ground color of the peripheral region (background image), thereby generating the periphery-cleared image D2.

Here, the generator 29 identifies the ground color of the peripheral region located outside the character region CA of the source image D1, by detecting, for example, the color of the pixel of the position where the hand-written memoranda is non-existent, in the peripheral region of the image data representing the source image D1. Alternatively, the generator 29 may adopt the average color of all or a part of the pixels in the peripheral region where the hand-written memoranda are non-existent, as the ground color of the peripheral region.

The generator 29 deletes the annotation lines L1 to L3 identified by annotation line identifier 24 from the image of the character region CA of the periphery-cleared image D2, thereby generating the modified image CID.

The controller 21 causes the display device 12 to display the modified image CID. When the user inputs a printing instruction through the operation device 14, the controller 21 causes the image forming device 18 to form the modified image CID on the recording sheet. When the user inputs an instruction to output the data, through the operation device 14, the controller 21 causes the communication device 16 to transmit (output) the image data representing the modified image CID, to the external device 30.

Figure 5:
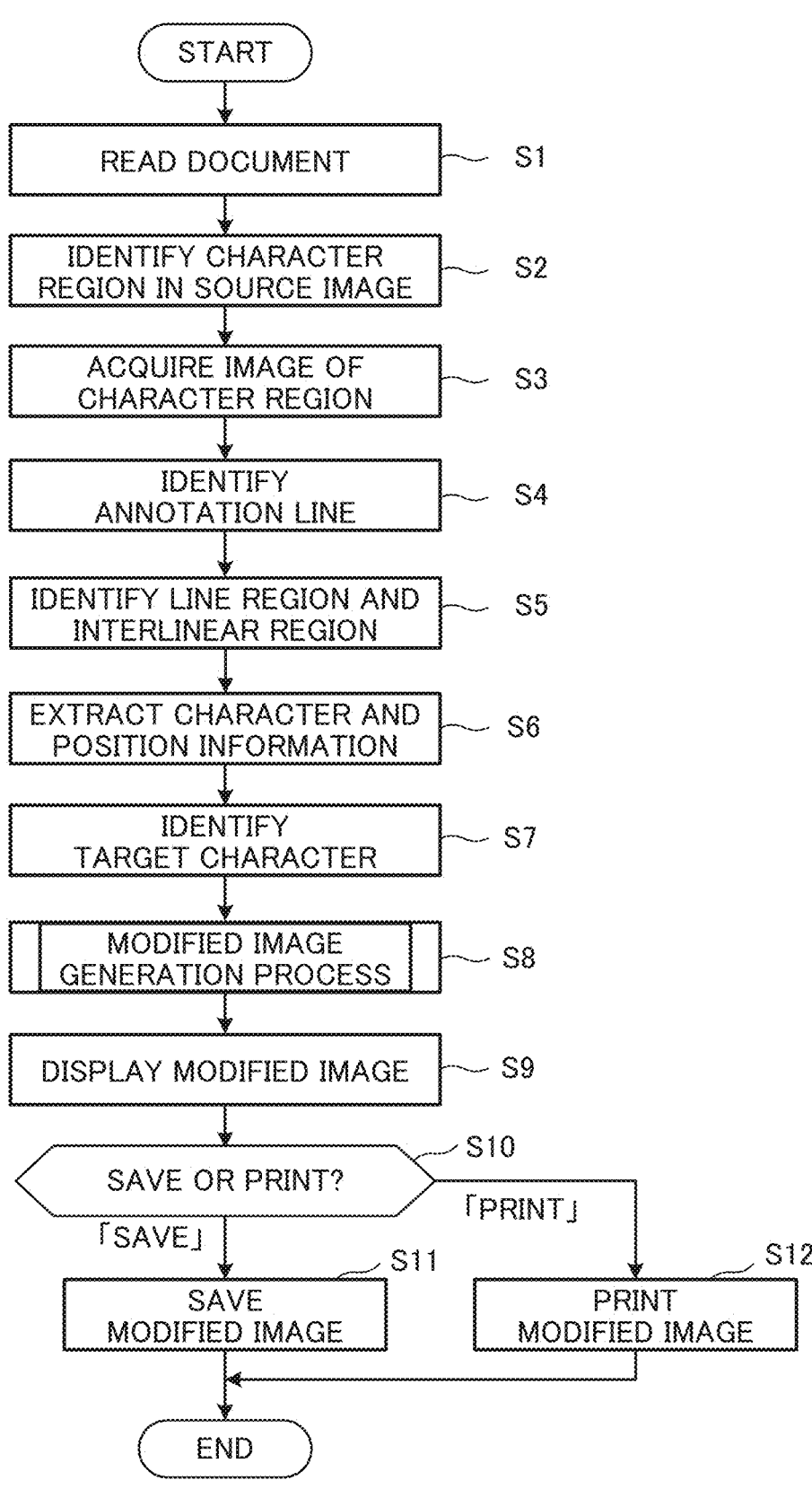
FIG. 5 is a flowchart showing an example of the hand-written memoranda deletion process.

Hereunder, the hand-written memoranda deletion process executed by the image forming apparatus 10 will now be described. FIG. 5 is a flowchart showing an example of the hand-written memoranda deletion process.

When the touch panel 15 detects a touch on a key KB showing a character string "Scan and delete memo", while the screen 40 is displayed on the display device 12, the controller 21 starts to execute the hand-written memoranda deletion process shown in FIG. 5. To be more specific, when the user touches the key KB, the touch panel 15 detects the touch on the key KB, and outputs a start signal of the hand-written memoranda deletion process, to the controller 21. The controller 21 starts to execute the hand-written memoranda deletion process, in response to the input of the start signal.

When the operation device 14 detects that the user has pressed the start button, after the user sets the source document G1, on which the hand-written memoranda are marked as shown in FIG. 3, on the image reading device 17, the controller 21 causes the image reading device 17 to read the source document G1 (step S1). The controller 21 stores the image data generated by the image reading device 17 and representing the source image D1, in the source image storage device 19A.

Figure 6B:
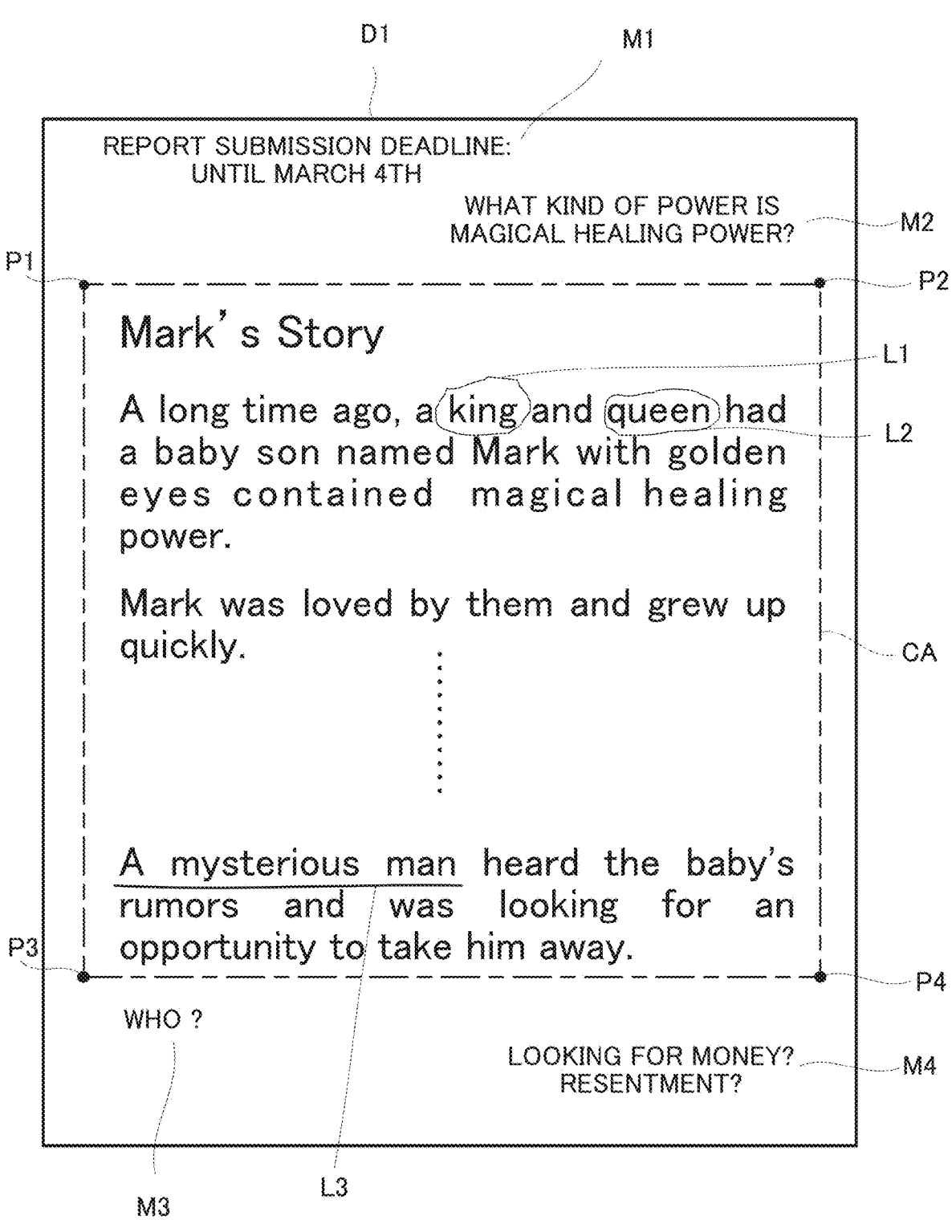
FIG. 6B is a schematic drawing showing an example of a character region identified in the source image.

FIG. 6A is a schematic drawing showing an example of the source image D1 subjected to layout analysis. FIG. 6B is a schematic drawing showing an example of the character region CA identified in the source image D1. The character region identifier 22 performs the layout analysis included in the OCR process with respect to the source image D1 shown in FIG. 6A, thereby identifying the character region CA in the source image D1, as shown in FIG. 6B (step S2). The character region identifier 22 also acquires the position information indicating the position of the character region CA in the source image D1, on the basis of the coordinate information of the source image D1. For example, the character region identifier 22 acquires the position information indicating the respective coordinates of the upper left corner P1, upper right corner P2, lower left corner P3, and the lower right corner P4, of the character region CA.

The image acquirer 23 acquires the image of the character region CA identified by the character region identifier 22, from the source image D1 shown in FIG. 6B (step S3).

Figure 7:
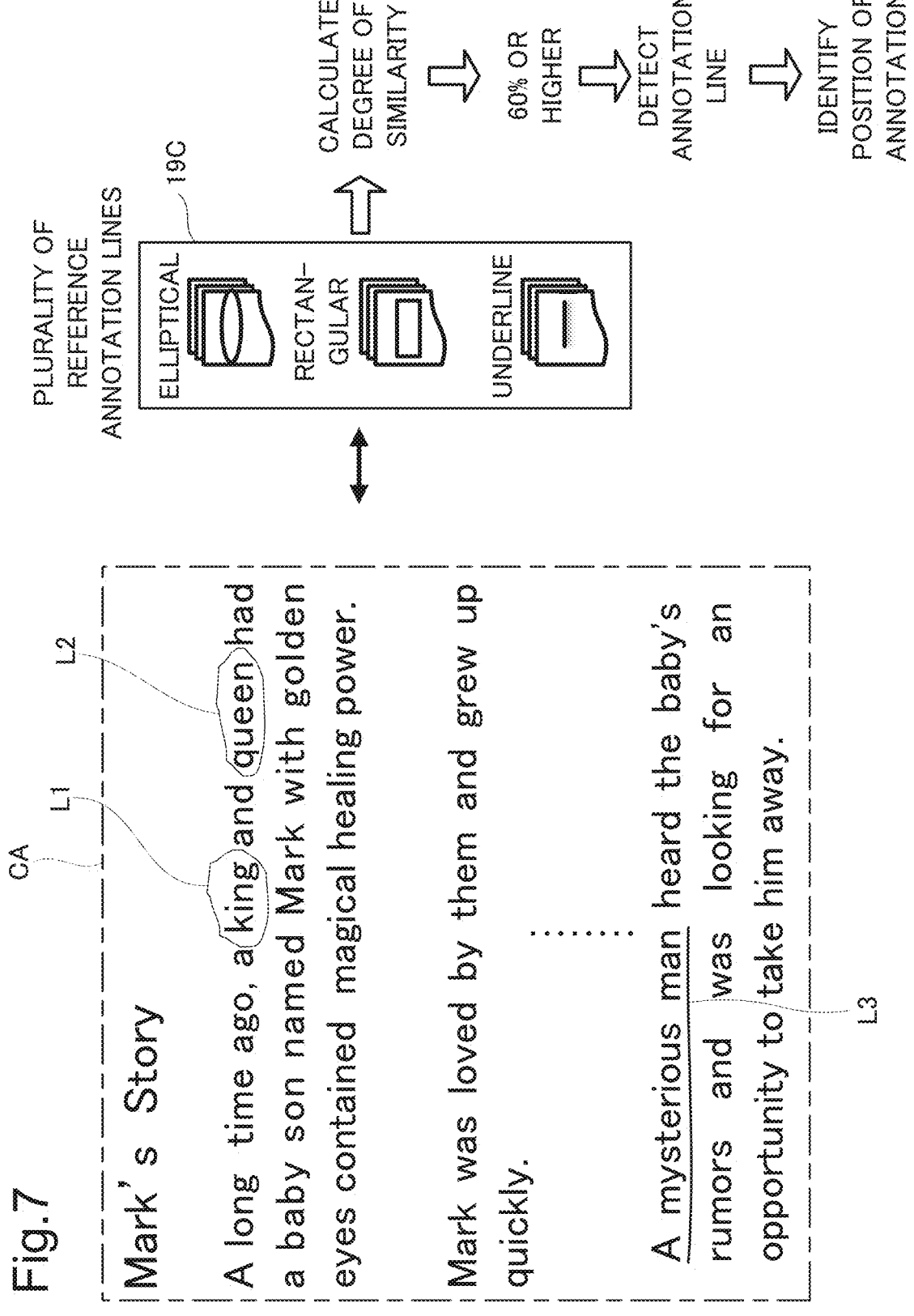
FIG. 7 is a schematic drawing showing an example of an annotation line detection method.

FIG. 7 is a schematic drawing showing an example of the method to detect the annotation lines L1 to L3. The annotation line identifier 24 detects the lines L1 to L3, the degree of similarity of which to one of the plurality of reference annotation lines, stored in the annotation line storage device 19C, is equal to or higher than a predetermined degree (e.g., 60%), in the character region CA, as the annotation lines L1 to L3, as shown in FIG. 7, and identifies the respective positions of the annotation lines L1 to L3 (step S4).

To be more specific, first the annotation line identifier 24 calculates, with respect to each of the line L1 and line L2 in the character region CA, a first degree of similarity indicating the degree of similarity to elliptical reference annotation lines stored in the annotation line storage device 19C, as shown in FIG. 7. In this case, it will be assumed that the annotation line identifier 24 has calculated the first degree of similarity of the line L1 as 68%, and the first degree of similarity of the line L2 as 70%. Then the annotation line identifier 24 calculates a second degree of similarity, indicating the degree of similarity to rectangular reference annotation lines stored in the annotation line storage device 19C, with respect to each of the line L1 and line L2. In this case, it will be assumed that the annotation line identifier 24 has calculated the second degree of similarity of the line L1 as 45%, and the second degree of similarity of the line L2 as 58%. Further, the annotation line identifier 24 calculates a third degree of similarity, indicating the degree of similarity to underline reference annotation lines stored in the annotation line storage device 19C, with respect to each of the line L1 and line L2. In this case, it will be assumed that the annotation line identifier 24 has calculated the third degree of similarity of the line L1 as 10%, and the third degree of similarity of the line L2 as 12%. Since the first degree of similarity of each of the line L1 and the line L2 is higher than 60%, the annotation line identifier 24 detects the line L1 and the line L2 as the annotation line L1 and the annotation line L2, and identifies the respective positions of the annotation line L1 and the annotation line L2, on the basis of the coordinate information of the source image D1.

In addition, the annotation line identifier 24 calculates the first degree of similarity, with respect to the line L3 in the character region CA, as shown in FIG. 7. In this case, it will be assumed that the annotation line identifier 24 has calculated the first degree of similarity of the line L3 as 10%. Then the annotation line identifier 24 calculates the second degree of similarity, with respect to the line L3. In this case, it will be assumed that the annotation line identifier 24 has calculated the second degree of similarity of the line L3 as 12%. Further, the annotation line identifier 24 calculates the third degree of similarity, with respect to the line L3. In this case, it will be assumed that the annotation line identifier 24 has calculated the third degree of similarity of the line L3 as 82%. Since the third degree of similarity of the line L3 is higher than 60%, the annotation line identifier 24 detects the line L3 as the annotation line L3, and identifies the position of the annotation line L3, on the basis of the coordinate information of the source image D1.

The line region identifier 25 and the interlinear region identifier 26 respectively identify the line regions CLA and the interlinear regions LSA, in the character region CA (step S5). FIG. 8 is a schematic drawing showing an example of the identification method of the line region CLA and the interlinear region LSA. As shown in FIG. 8, the line region identifier 25 identifies, with respect to each of the character lines in the character region CA, the line including the upper-end position of the tallest character among the plurality of characters contained in the character line, as the upper-end line LU, and the line including the lower-end position of the character at the lowest position, as the lower-end line LD. The line region identifier 25 also identifies the line including the left-end position of the character region CA shown in FIG. 6B, as the left-end line LL as shown in FIG. 8, and the line including the right-end position of the character region CA as the right-end line LR as shown in FIG. 8. Then the line region identifier 25 identifies the region surrounded by the upper-end line LU, the lower-end line LD, the left-end line LL, and the right-end line LR, as the line region CLA.

The interlinear region identifier 26 identifies the region located between the line regions CLA adjacent to each other, as the interlinear region LSA, as shown in FIG. 8. For example, the interlinear region identifier 26 identifies the region surrounded by the lower-end line LD of the line region CLA identified by the line region identifier 25, the upper-end line LU of the line region CLA adjacent to the lower-end line LD on the lower side, a line including the left-end position and a line including the right-end position, of the character region CA shown in FIG. 6B, as the interlinear region LSA.

Figure 9A:
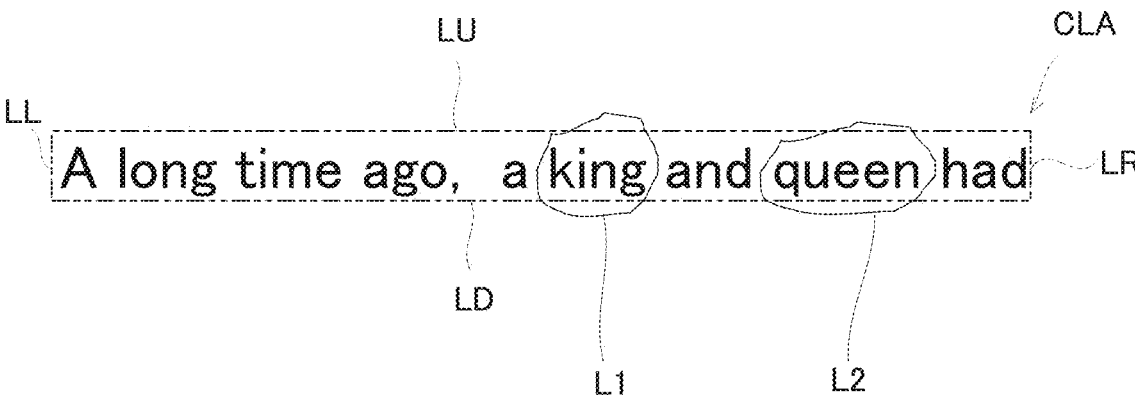
FIG. 9A is a schematic drawing showing an example of the line region containing a target character.

The character data extractor 27 performs the OCR process with respect to the character region CA, to thereby extract a plurality of characters contained in each of the line regions CLA in the character region CA (character data), and a plurality of pieces of position information indicating the respective positions of the plurality of characters, in association with each other (step S6). FIG. 9A is a schematic drawing showing an example of the line region containing a target character. Regarding the line region CLA shown in FIG. 9A for example, the character data extractor 27 extracts the character data indicating the characters and blank spaces contained in the line region CLA, and the position information of each of the characters and blank spaces, in association with each other.

Figure 9B:
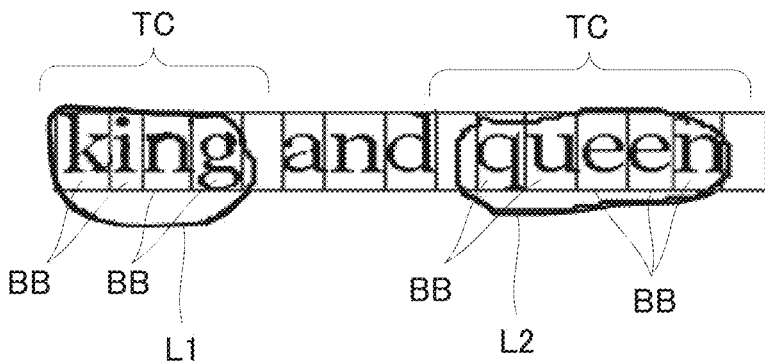
FIG. 9B is a schematic drawing showing a portion of the line region containing the target character.

The target character identifier 28 identifies the character corresponding to the position information indicating the position according with the position of the annotation line identified by the annotation line identifier 24, out of the plurality of pieces of position information extracted by the character data extractor 27, as the target character TC with which the annotation line is overlapping, out of the characters in the line region CLA (step S7). FIG. 9B is a schematic drawing showing the portion of the line region containing the target character. In the example shown in FIG. 9B, the position of the annotation line L1 accords with the position indicated by the position information of each character in "king", and the position indicated by the position information of the blank space immediately following "king". Accordingly, the target character identifier 28 identifies each character of "king" and the immediately following blank space, as the target character TC with which the annotation line L1 is overlapping. In addition, the position of the annotation line L2 accords with the position indicated by the position information of each character in "queen", and the position indicated by the position information of blank spaces preceding and following "queen". Accordingly, the target character identifier 28 identifies each character of "queen" and the preceding and following blank spaces, as the target character TC with which the annotation line L2 is overlapping.

Figure 10:
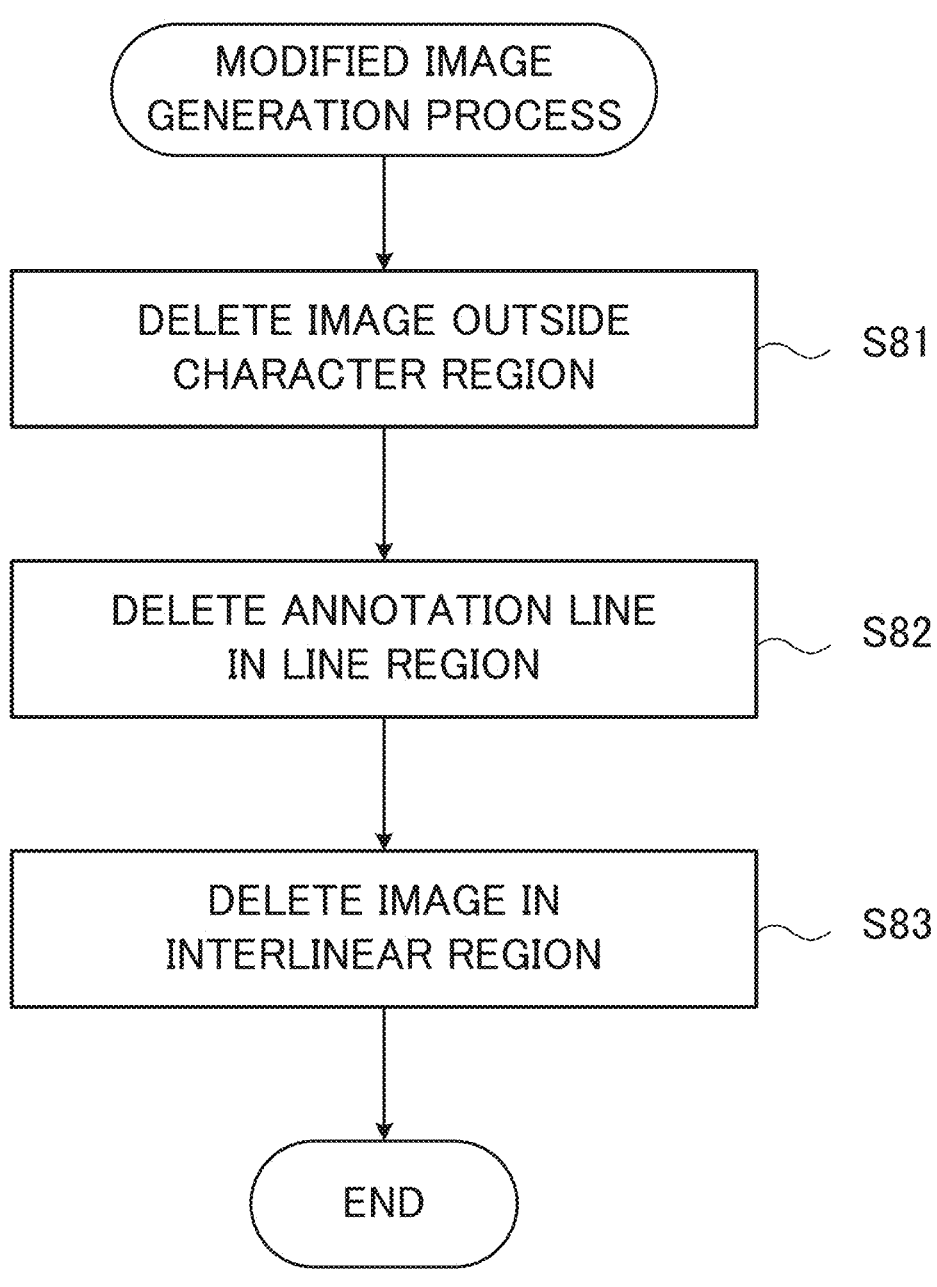
FIG. 10 is a flowchart showing an example of a modified image generation process.

The generator 29 executes a modified image generation process, for generating the modified image CID from the source image D1 (step S8). FIG. 10 is a flowchart showing an example of the modified image generation process.

Figure 11A:
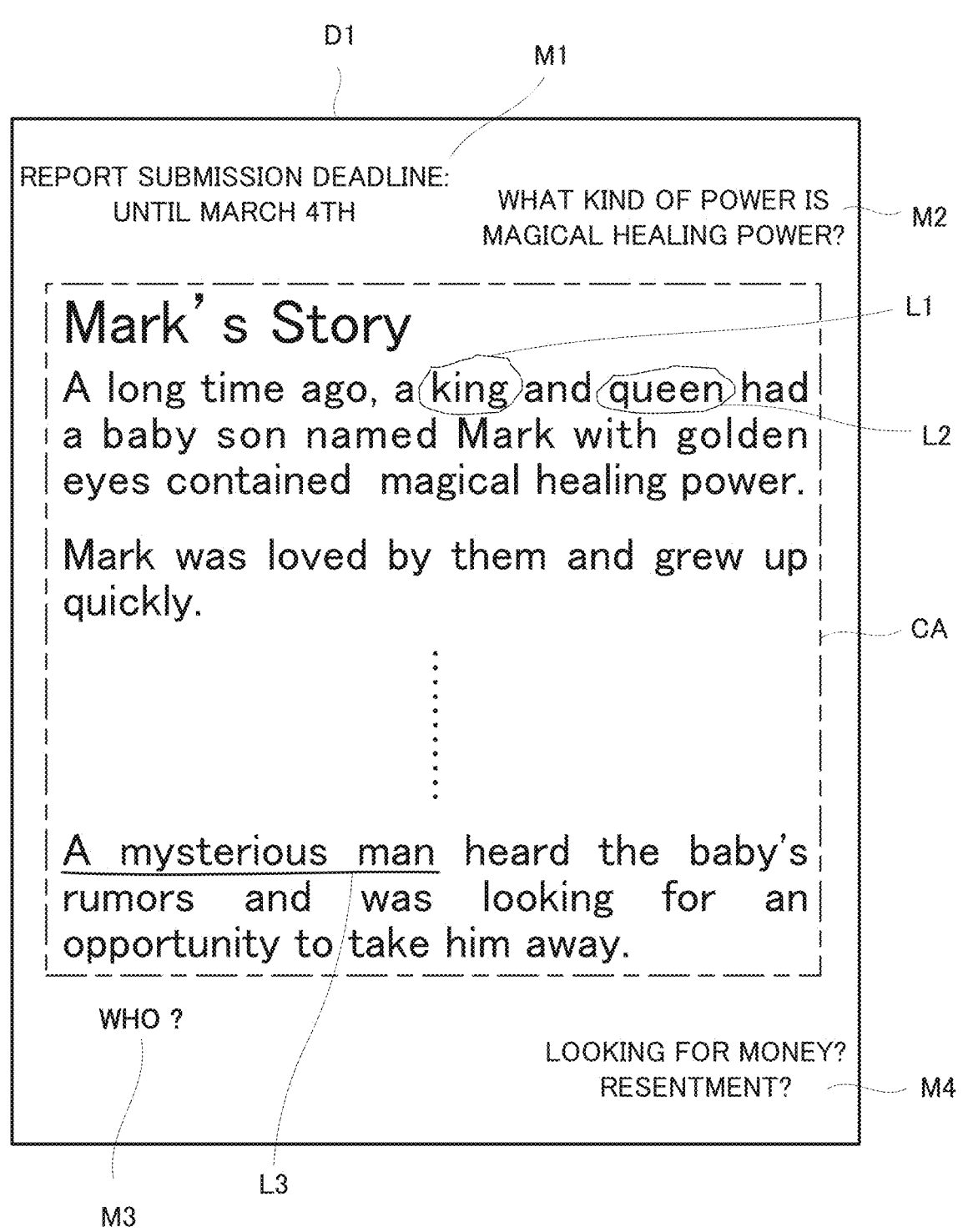
FIG. 11A is a schematic drawing showing an example of the source image containing the hand-written memoranda.

The generator 29 deletes the image in the peripheral region located outside the character region CA, thereby generating the periphery-cleared image D2 (step S81). FIG. 11A is a schematic drawing showing an example of the source image D1 containing the hand-written memoranda. FIG. 11B is a schematic drawing showing an example of the periphery-cleared image D2.

For example, the generator 29 synthesizes, on the peripheral region located outside the character region CA in the source image D1, a solid image of the ground color of the peripheral region (background image), thereby generating the periphery-cleared image D2 shown in FIG. 11B. The periphery-cleared image D2 does not include character strings M1 to M4, composed of hand-written characters.

Referring again to FIG. 10, the generator 29 deletes the images of the annotation line L1 and the annotation line L2 inside the line region CLA shown in FIG. 8, from the image of the character region CA in the periphery-cleared image D2 (step S82). To be more specific, the generator 29 substitutes the target characters TC with which the annotation line L1 and the annotation line L2 are overlapping in the line region CLA, with images of appropriate characters the same as or similar to the target character TC, thereby deleting the images of the annotation line L1 and the annotation line L2, from the line region CLA.

Figure 12:
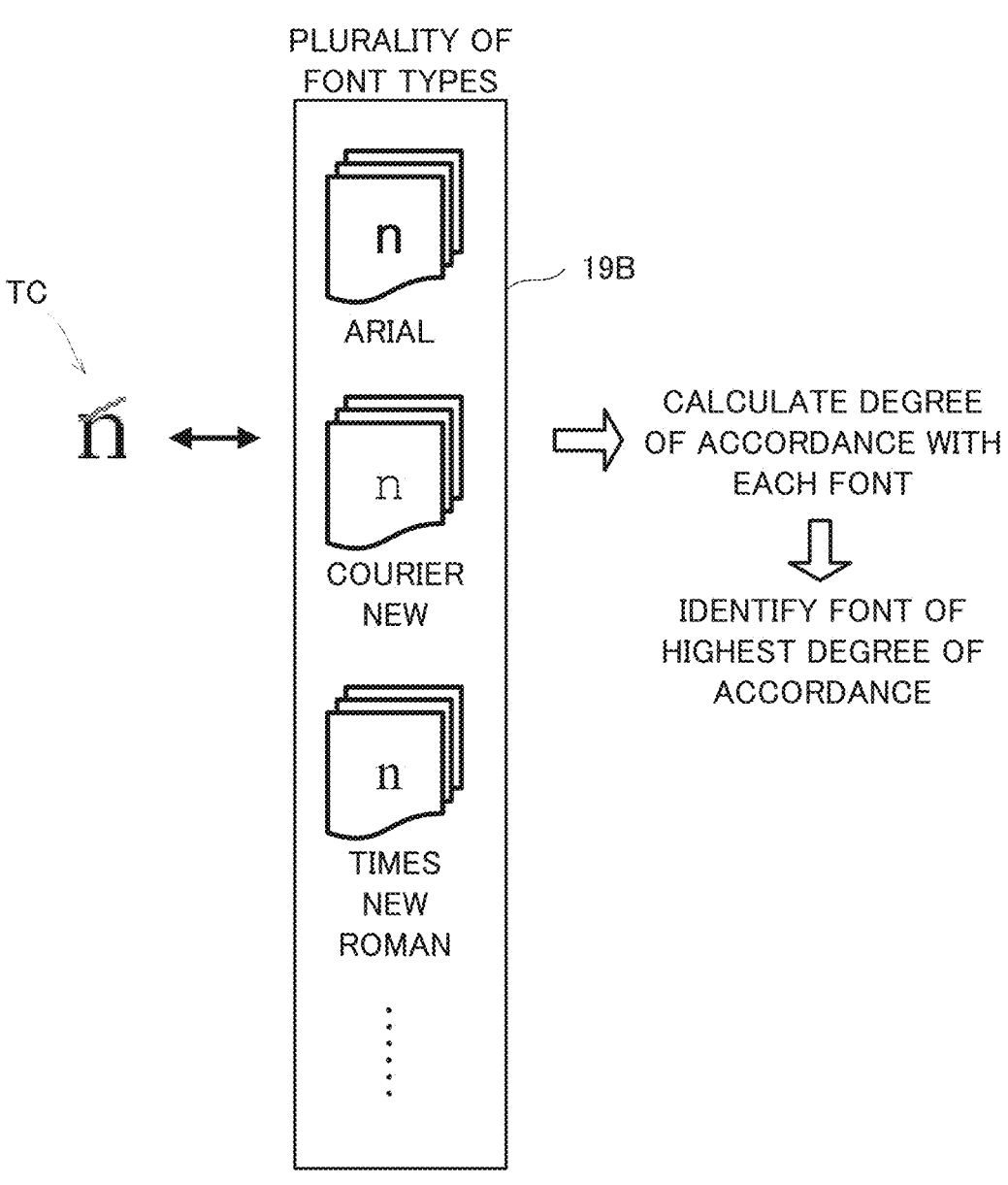
FIG. 12 is a schematic drawing showing a font identification process.
Figure 15A:
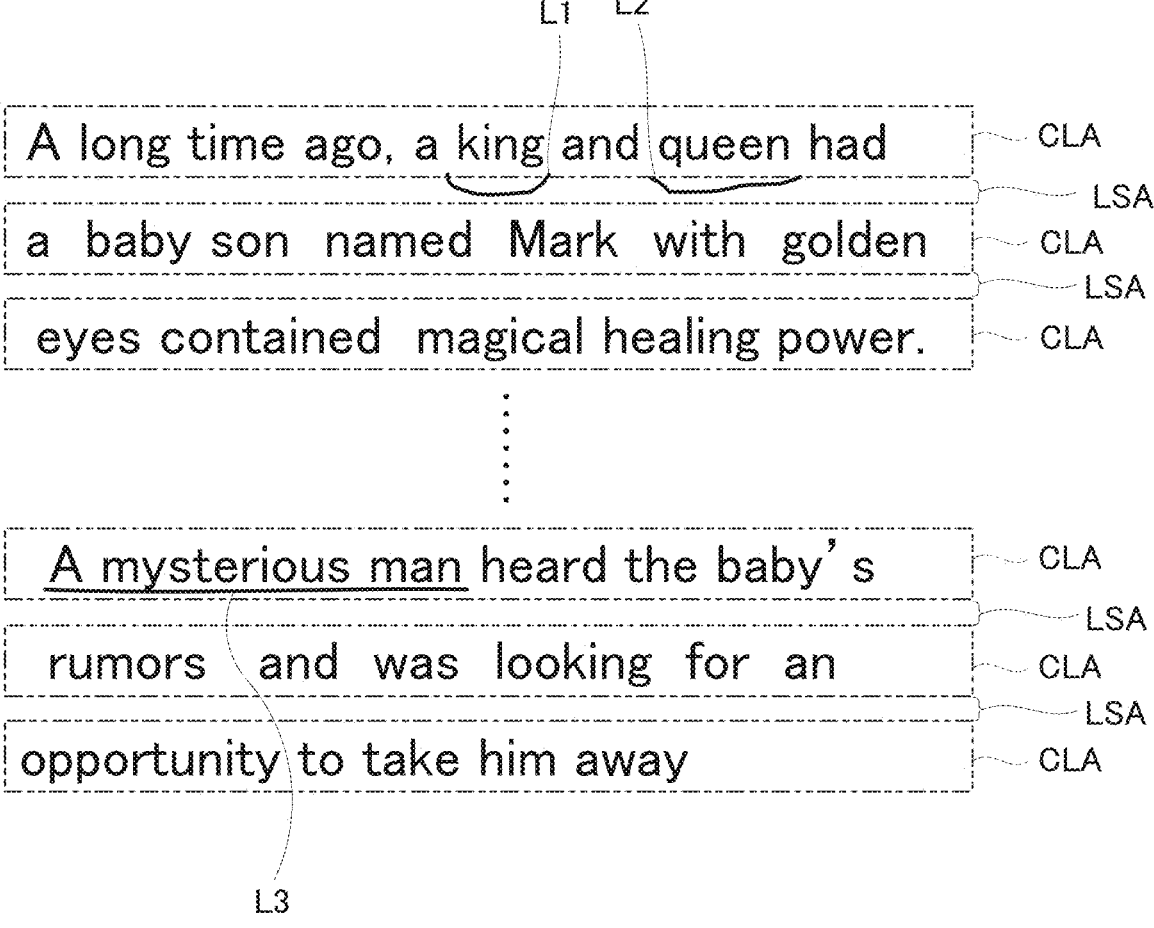
FIG. 15A is a schematic drawing showing an example of the character region in which the annotation line has been deleted from the line region.

Referring now to FIG. 12 to FIG. 15A, the method to delete the images of the annotation line L1 and the annotation line L2 from the line region CLA will be described in detail. FIG. 12 is a schematic drawing showing a font identification process for identifying the font most similar to the font of the target character TC. FIG. 13 is a schematic drawing showing an example of the font identification process. FIG. 14 is a schematic drawing showing an example of a character identification process for identifying the character most similar to the target character TC. FIG. 15A is a schematic drawing showing an example of the character region CA, in which the annotation line L1 and the annotation line L2 have been deleted from the line region CLA.

Referring to FIG. 12, the generator 29 identifies the font most similar to the font of the target character TC with which the annotation line L1 is overlapping (in this example, the character "n" with which the annotation line L1 is overlapping). To be more specific, the generator 29 calculates the degree of accordance with the target character TC, with respect to each of the plurality of font types stored in the font storage device 19B (e.g., "Arial", "Courier New", and "Times New Roman"). The generator 29 identifies the font of the highest degree of accordance, as the most similar font.

The generator 29 divides, as shown in FIG. 13, a rectangular boundary box BB formed by partitioning the target characters TC in the line region CLA into each of the characters, and a plurality of rectangular character boxes CB prepared for each of a predetermined plurality of characters, respectively expressed in the plurality of font types stored in the font storage device 19B, into pixel regions of predetermined rows and columns (e.g., 22×22) partitioned in a grid pattern of the same rows and columns (e.g., 22×22). The generator 29 identifies the font in the character box CB, in which the pixel region shows the highest degree of accordance with respect to the boundary box BB, among the character boxes CB of the plurality of font types, as the font most similar to the font of the target character TC.

It will be assumed here that, as shown in FIG. 13, the generator 29 has calculated the degree of accordance between the target character TC which is "q", and the character "q" expressed in the font of "Arial", "Courier New", and "Times New Roman", as 91.03%, 83.10%, and 95.07%, respectively. In this case, the degree of accordance of the font of "Times New Roman" is highest. Therefore, the generator 29 identifies "Times New Roman", as the font most similar to the font of the target character TC.

The generator 29 divides, as shown in FIG. 14, the rectangular boundary box BB formed by partitioning the target characters TC in the line region CLA into each of the characters, and the plurality of rectangular character boxes CB prepared for each of the predetermined plurality of characters, expressed in the font identified as above (in this case, "Times New Roman"), into the pixel regions of predetermined rows and columns (e.g., 22×22) partitioned in the grid pattern of the same rows and columns (e.g., 22×22). The generator 29 identifies the character expressed by the character box CB, in which the pixel region shows the highest degree of accordance with respect to the boundary box BB, among the character boxes CB of the font of "Times New Roman", as the character most similar to the target character TC.

It will be assumed here that, as shown in FIG. 14, the generator 29 has calculated the degree of accordance between the target character TC which is "n", and characters "h", "n", and "p" out of a predetermined plurality of characters expressed in "Times New Roman", as 88.82%, 91.39%, and 86.78%, respectively. In this case, the degree of accordance of the character "n" is highest. Therefore, the generator 29 identifies "n", as the character most similar to the target character TC.

Figure 9C:
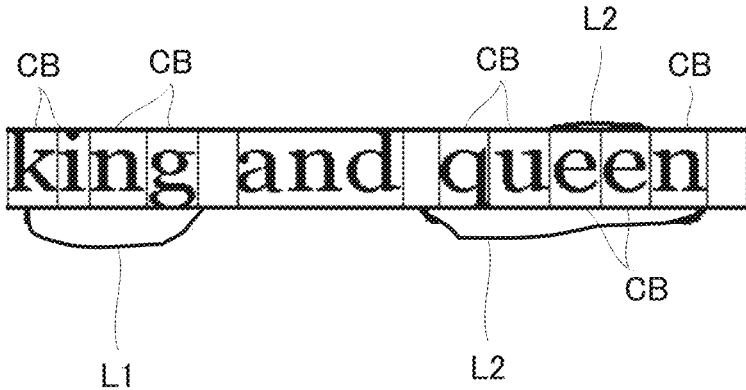
FIG. 9C is a schematic drawing showing an example of the line region from which the annotation line has been deleted.

Then the generator 29 synthesizes the image of the character most similar to the target character TC (i.e., character "n" expressed in the font of "Times New Roman"), on the image of the character "n" with which the annotation line L1 is overlapping in the line region CLA. FIG. 9C is a schematic drawing showing an example of the line region from which the annotation line has been deleted. As shown in FIG. 9C, the generator 29 synthesizes, for example, the character box CB of "n" expressed in the font of "Times New Roman", on the boundary box BB of the target character TC "n". In this case, the boundary box BB and the character box CB are without the grid.

The generator 29 also synthesizes, as described above, the character image in the font most similar to the font of the target character TC, with respect to each of the characters of "king" other than "n", and each of the characters of "queen". In other words, the generator 29 synthesizes the character box CB of the most similar character in the most similar font, on each of the boundary boxes BB of the target character TC. On the blank space in which the annotation line L1 or annotation line L2 is overlapping, the generator 29 synthesizes an image of the blank space.

As described above, the generator 29 substitutes the target character TC in the line region CLA with the character of the highest degree of accordance with the target character TC. In other words, the generator 29 synthesizes, on the target character TC, the character image of the font most similar to the font of the target character TC. As result, the target character TC, with which the annotation line L1 or annotation line L2 is overlapping in the line region CLA, is substituted with the image of the appropriate character same as or similar to the target character TC, and thus the images of the annotation line L1 and the annotation line L2 are deleted from the line region CLA, as shown in FIG. 15A.

Here, since the annotation line L3 is located in the interlinear region LSA in FIG. 15A, the generator 29 does not delete the annotation line L3 at step S82. The generator 29 deletes the annotation line L3 at the next step S83.

Back again to FIG. 10, the generator 29 deletes the image in the interlinear region LSA (step S83). For example, the generator 29 synthesizes, on the interlinear region LSA, a solid image of the ground color of the interlinear region LSA (background image), thereby deleting the annotation line L3 marked in the interlinear region LSA, as shown in FIG. 15B.

FIG. 15B is a schematic drawing showing an example of the character region CA from which the image in the interlinear region LSA has been deleted. As result of the operation of step S83, the annotation line L3 marked in the interlinear region LSA is deleted.

As described above, the generator 29 generates the periphery-cleared image D2 as shown in FIG. 11B, by deleting the image in the peripheral region located outside the character region CA in the source image D1 (step S81). The generator 29 deletes the annotation lines L1 to L3 from the image of the character region CA in the periphery-cleared image D2, as shown in FIG. 15B (step S82, step S83). Thus, the generator 29 generates the modified image CID, shown in FIG. 16. FIG. 16 is a schematic drawing showing an example of the image data representing the modified image CID, formed by deleting the hand-written memoranda.

Referring again to FIG. 5, the controller 21 causes the display device 12 to display the modified image CID shown in FIG. 16 (step S9).

The controller 21 decides whether the instruction to save or print has been received from the user (step S10). When the touch panel 15 detects a press of a "Save" button ("Save" at step S10), the controller 21 stores the modified image CID in the storage device 19 (step S11), and finishes the hand-written memoranda deletion process. When the touch panel 15 detects a press of a "Print" button ("Print" at step S10), the controller 21 causes the image forming device 18 to form the modified image CID on the recording sheet (step S12), and finishes the hand-written memoranda deletion process.

Here, the controller 21 may additionally decide whether an instruction of "Transmit" has been received, at step S10. In this case, when the instruction to output the data, for example a press of a "Transmit" button is inputted by the user through the operation device 14, the controller 21 causes the communication device 16 to transmit (output) the modified image CID to the external device 30, and finishes the hand-written memoranda deletion process.

According to the foregoing embodiment, the image acquirer 23 acquires the image of the character region CA, from the source image D1. The annotation line identifier 24 detects the annotation lines L1 to L3 in the character region CA, and identifies the respective positions of the annotation lines L1 to L3. The generator 29 generates, from the source image D1, the modified image CID not containing the image located outside the character region CA in the source image D1, and in which the annotation lines L1 to L3 have been deleted from the image of the character region CA.

Therefore, when the annotation lines L1 to L3, such as the hand-written underline or enclosure, are marked on selected phrases in the character region CA of the source image D1, the modified image CID, in which the annotation lines L1 to L3 have been deleted, is generated. Since the generated modified image CID does not contain the image located in the peripheral region outside the character region CA of the source image D1, there is no need to decide whether the hand-written characters are included in the image in the peripheral region, or individually delete each of the hand-written characters. Accordingly, the image in which the hand-written memoranda have been deleted can be quickly acquired, from the source image D1 containing the hand-written memoranda such as the hand-written character and hand-written annotation line, and the deletion accuracy of the hand-written memoranda can be improved.

According to the foregoing embodiment, the line region identifier 25 identifies the line region CLA in the character region CA. The interlinear region identifier 26 identifies the interlinear region LSA located between the line regions CLA. The character data extractor 27 extracts the plurality of characters contained in the line region CLA, and the plurality of pieces of position information indicating the position of the respective characters, in association with each other. The target character identifier 28 identifies the character corresponding to the position information indicating the position according with the position of the annotation lines L1 to L3 identified by the annotation line identifier 24, among the plurality of pieces of position information extracted by the character data extractor 27, as the target character TC with which one of the annotation lines L1 to L3 is overlapping. The generator 29 substitutes the target character TC in the line region CLA with the character showing the highest degree of accordance with the target character TC, and deletes the image in the interlinear region LSA, thereby deleting the annotation lines L1 to L3 from the image of the character region CA.

Therefore, the annotation lines L1 to L3 in the character region CA can be properly deleted. As result, the deletion accuracy of the hand-written memoranda can be further improved.

In addition, according to the foregoing embodiment, the generator 29 divides the rectangular boundary box BB formed by partitioning the target characters TC in the line region CLA into each of the characters, and the plurality of rectangular character boxes CB prepared for each of the predetermined plurality of characters, respectively expressed in the plurality of font types stored in the font storage device 19B, into pixel regions of predetermined rows and columns partitioned in a grid pattern of the same rows and columns, identifies the character box CB, in which the pixel region shows the highest degree of accordance with respect to the boundary box BB, among the plurality of character boxes CB, and substitutes the target character TC with the character in the character box CB of the highest degree of accordance.

Therefore, the target characters TC with which the annotation lines L1 to L3 are respectively overlapping can be substituted with the character free from the annotation lines L1 to L3, with high accuracy. As result, the annotation lines L1 to L3 located in the character region CA can be properly deleted.

Further, according to the foregoing embodiment, the character region identifier 22 performs the layout analysis with respect to the source image D1 stored in the source image storage device 19A, thereby identifying the rectangular region in the source image D1 containing all the characters, as the character region CA. The line region identifier 25 identifies, with respect to each of the character lines in the character region CA, the line including the upper-end position of the tallest character among the plurality of characters contained in the character line, as the upper-end line, and the line including the lower-end position of the character at the lowest position, as the lower-end line. The line region identifier 25 further identifies the line including the left-end position of the character region CA as the left-end line, and the line including the right-end position of the character region CA as the right-end position. The line region identifier 25 identifies the region surrounded by the upper-end line, the lower-end line, the left-end line, and the right-end line, as the line region CLA.

Therefore, the line region CLA, including the character line in the character region CA can be properly identified.

Further, according to the foregoing embodiment, the annotation line identifier 24 detects the lines, the degree of similarity of which to one of the plurality of reference annotation lines, stored in the annotation line storage device 19C, is equal to or higher than the predetermined degree, in the character region CA, as the annotation lines L1 to L3, and identifies the respective positions of the annotation lines L1 to L3.

Therefore, even when the plurality of annotation lines L1 to L3 are marked in the character region CA, such annotation lines L1 to L3 can be properly detected.

According to the foregoing embodiment, further, the generator 29 deletes the image in the peripheral region located outside the character region CA, from the source image D1, thereby generating the periphery-cleared image D2, and deletes the annotation lines L1 to L3 from the image in the character region CA in the periphery-cleared image D2, thereby generating the modified image CID.

Therefore, the hand-written memoranda can be made non-existent, in the peripheral region of the character region CA in the modified image CID. Such an arrangement eliminates the need to individually delete each of the hand-written memoranda, from the peripheral region. Consequently, the image in which the hand-written memoranda have been deleted can be quickly acquired, from the source image D1 containing the hand-written memoranda, and the deletion accuracy of the hand-written memoranda can be further improved.

Figure 17:
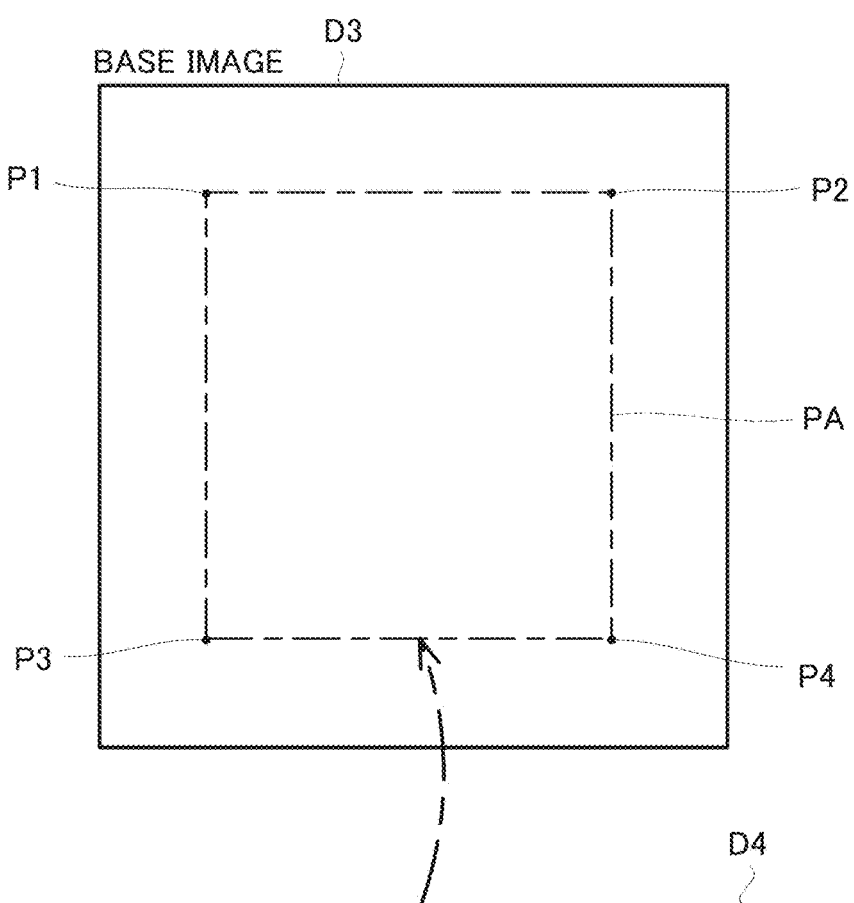
FIG. 17 is a schematic drawing showing an example of a modified image generation method.

Referring now to FIG. 17, the image forming apparatus 10 according to a variation of the foregoing embodiment will be described hereunder. FIG. 17 is a schematic drawing showing an example of the modified image generation method, according to the variation of the foregoing embodiment.

The image forming apparatus 10 according to this variation is different from the foregoing embodiment, in that, as shown in FIG. 17, the modified image CID is generated by synthesizing an image D4, in which the annotation lines L1 to L3 have been deleted from the image of the character region CA, on a base image D3. In the following description, the same elements as those described with reference to the foregoing embodiment are given the same numeral, and the description of such elements will not be repeated.

The generator 29 generates the modified image CID, by placing, as shown in FIG. 17, the image D4 in which the annotation lines L1 to L3 have been deleted from the image of the character region CA, on a base image D3 of the same external dimensions as those of the source image D1 stored in the source image storage device 19A (e.g., standard A4 size or B5 size), in a region PA covering the same area as the character region CA in the source image D1.

Here, the generator 29 can detect the external dimensions of the source image D1, by performing a known edge detection process, with respect to the source image D1. Alternatively, the generator 29 may detect the external dimensions of the source image D1, by utilizing a detection signal from a document size sensor that detects the external dimensions of the source document G1, delivered from the automatic document feeder, or placed on the flat bed.

With such variation, the hand-written memoranda can be made non-existent, in the peripheral region outside the character region CA in the modified image CID. Such an arrangement eliminates the need to individually delete each of the hand-written memoranda, from the peripheral region. Consequently, the image in which the hand-written memoranda have been deleted can be quickly acquired, from the source image D1 containing the hand-written memoranda, and the deletion accuracy of the hand-written memoranda can be further improved.

The present invention may be modified in various manners, without limitation to the configuration according to the foregoing embodiment.

Although the character region identifier 22 identifies the character region CA through the layout analysis of the source image D1, in the foregoing embodiment and the variation thereof, the present invention is not limited to such embodiment. For example, the character region identifier 22 may identify the character region CA in the source image D1, according to the designation of the character region CA by the user. For example, when the touch panel 15 detects a two-point operation, performed by the user by touching the upper left corner and the lower right corner of the rectangular region, on the source image D1 displayed on the display device 12, the character region identifier 22 can identify the rectangular region, as the character region CA. Here, the mentioned operation by the user may be a four-point operation including pointing the four corners of the rectangular region, or an operation to surround the image (drag operation).

Although the generator 29 executes the operation in the order of step S81, step S82, and step S83 as shown in FIG. 10, in the foregoing embodiment, the present invention is not limited to such embodiment. The generator 29 may execute the operation in a desired order, for example in the order of step S81, step S83, and step S82, or in the order of step S82, step S83, and step S81.

The generator 29 may calculate the degree of accordance between the boundary box BB from which the annotation line has been deleted, and the character box CB. To be more specific, when the image reading device 17 includes a color scanner, and the color of the characters in the character region CA shown in FIG. 6B (e.g., black) is different from the color of the annotation lines L1 to L3 (e.g., red), the generator 29 may delete the pixels of the annotation line L1 from the target character TC shown in FIG. 14 (e.g., changing to the ground color), thereby generating the boundary box BB from which the annotation line has been deleted. The generator 29 can identify the pixels of the annotation line L1 in the boundary box BB, on the basis of the position information indicating the position of the annotation line L1 written in red, identified by the annotation line identifier 24. The generator 29 then calculates the degree of accordance of the pixel region, between the boundary box BB from which the annotation line has been deleted and the character box CB. Such an arrangement contributes to further improving the substitution accuracy of the target character TC.

Although the image processing apparatus is exemplified by the image processing apparatus 2 incorporated in the image forming apparatus 10, in the foregoing embodiment and the variation thereof, the present invention is not limited to such embodiment. The present invention is applicable, for example, to an image processing apparatus including the control device 11 and the storage device 19 shown in FIG. 2 (e.g., personal computer, server, mobile information terminal, and so forth).

The configurations and processings described in the foregoing embodiments with reference to FIG. 1 to FIG. 17 are merely exemplary, and in no way intended to limit the present invention to those configurations and processings.

The invention claimed is:

1. An image processing apparatus comprising:
a storage device for storing a source image;
a control device that includes a processor and, through the processor executing a control program, acts as:
a character region identifier that identifies a character region in the source image;
an image acquirer that acquires an image of the character region from the source image;
an annotation line identifier that detects an annotation line in the character region, and identifies a position of the annotation line;
a generator that generates, from the source image, a modified image not containing an image located outside the character region in the source image, and in which the annotation line has been deleted from the image of the character region;
a line region identifier that identifies a line region located in the character region;
an interlinear region identifier that identifies an interlinear region located between the line regions;
a character data extractor that extracts a plurality of characters contained in the line region, and a plurality of pieces of position information indicating the respective positions of the plurality of characters, in association with each other; and
a target character identifier that identifies, as a target character, a character corresponding to the position information indicating a position according with the position of the annotation line identified by the annotation line identifier, out of the plurality of pieces of position information extracted by the character data extractor,
wherein the generator substitutes the target character in the line region with, among a predetermined plurality of characters, a character showing the highest degree of accordance with the target character, the degree of accordance being based on image similarity, and deletes the annotation line from the image of the character region, by deleting an image in the interlinear region.

2. The image processing apparatus according to claim 1, wherein the storage device further stores a plurality of types of font, and
the generator divides a rectangular boundary box formed by partitioning the target characters in the line region into each of the characters, and a plurality of rectangular character boxes prepared for each of a predetermined plurality of characters, respectively expressed in the plurality of font types, into pixel regions of predetermined rows and columns partitioned in a grid pattern of the same rows and columns, identifies the character box, in which the pixel region shows a highest degree of accordance with respect to the boundary box, among the plurality of character boxes, and substitutes the target character with the character indicated by the character box of the highest degree of accordance.

3. The image processing apparatus according to claim 1, wherein the character region identifier identifies a rectangular region including all the characters in the source image, as the character region, through layout analysis of the source image, and the line region identifier is configured to:

identify, with respect to each of the character lines located in the character region, a line including an upper-end position of a tallest character, among the plurality of characters contained in the character line, as an upper-end line, and identify a line including a lower-end position of a character located at a lowest position, as a lower-end line;

identify a line including a left-end position of the character region as a left-end line, and identify a line including a right-end position of the character region as a right-end line; and identify a region surrounded by the upper-end line, the lower-end line, the left-end line, and the right-end line, as the line region.

4. An image processing apparatus comprising:

a storage device for storing a source image;

a control device that includes a processor and, through the processor executing a control program, acts as:

a character region identifier that identifies a character region in the source image;

an image acquirer that acquires an image of the character region from the source image;

an annotation line identifier that detects an annotation line in the character region, and identifies a position of the annotation line; and a generator that generates, from the source image, a modified image not containing an image located outside the character region in the source image, and in which the annotation line has been deleted from the image of the character region, wherein the storage device further stores a plurality of reference annotation lines, and the annotation line identifier detects, from the character region, a line having a degree of image similarity to any one of the plurality of reference annotation lines that is equal to or higher than a predetermined degree, as the annotation line.

5. The image processing apparatus according to claim 1, wherein the generator generates a periphery-cleared image, by deleting an image in a peripheral region located outside the character region, from the source image, and generates the modified image by deleting the annotation line from the image of the character region in the periphery-cleared image.

6. The image processing apparatus according to claim 1, wherein the generator generates the modified image, by placing an image in which the annotation line has been deleted from the image of the character region, on a base image of same external dimensions as external dimensions of the source image, at a same position as the position of the character region in the source image.

7. The image processing apparatus according to claim 1, further comprising:

a display device; and a touch panel, wherein the character region identifier identifies, when the touch panel detects an operation performed on the source image displayed on the display device to designate a rectangular region, the rectangular region as the character region.

8. An image forming apparatus comprising:

the image processing apparatus according to claim 1;

an image reading device that reads a source document and generates the source image;

a controller that stores the source image generated by the image reading device in the storage device; and an image forming device that forms the modified image on a recording medium.

9. An image forming apparatus comprising:

the image processing apparatus according to claim 4;

an image reading device that reads a source document and generates the source image;

a controller that stores the source image generated by the image reading device in the storage device; and an image forming device that forms the modified image on a recording medium.

* * * * *